(12) United States Patent
Xie et al.

(10) Patent No.: US 7,177,882 B2
(45) Date of Patent: Feb. 13, 2007

(54) GEORASTER PHYSICAL DATA MODEL FOR STORING GEOREFERENCED RASTER DATA

(75) Inventors: Qingyun Xie, Nashua, NH (US); Weisheng Xu, Nashua, NH (US); Siva Ravada, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 480 days.

(21) Appl. No.: 10/800,739

(22) Filed: Mar. 16, 2004

(65) Prior Publication Data
US 2005/0055376 A1    Mar. 10, 2005

Related U.S. Application Data

(60) Provisional application No. 60/500,461, filed on Sep. 5, 2003.

(51) Int. Cl.
*G06F 17/00* (2006.01)
*G06F 7/00* (2006.01)

(52) U.S. Cl. .................... 707/104.1; 707/102
(58) Field of Classification Search ............ 707/104.1, 707/102
See application file for complete search history.

(56) References Cited

U.S. PATENT DOCUMENTS

2003/0187867 A1\* 10/2003 Smartt ................... 707/102
2004/0117358 A1\* 6/2004 von Kaenel et al. ........... 707/3

OTHER PUBLICATIONS

Garnash Artem: Management of Geographical Information in Mobile Environment, Pro graduate thesis in Information Systems, Sep. 14, 2000, University of Jyvaskyla, Finland.\*
Oracle Database 10g: Managing Geographic Raster Data Using GeoRaster, An Oracle Technical White Paper, Dec. 2003.\*

\* cited by examiner

*Primary Examiner*—John Cottingham
*Assistant Examiner*—Kuen S. Lu
(74) *Attorney, Agent, or Firm*—Bingham McCutchen LLP

(57) ABSTRACT

In one embodiment of the present invention, in a database management system, a system for handling geographic raster data comprises a first data table including a plurality of GeoRaster objects, each GeoRaster object including a spatial extent geometry and associated metadata, the spatial extent geometry identifying a footprint of a geographic raster data object and associated with at least one block of raster data, a second data table including a plurality of raster objects, each raster object associated with one block of raster data of a GeoRaster object and including information indicating a spatial extent of the block of raster data and information relating to the block of raster data, a first spatial index built on the first data table based on the spatial extent geometry of each of the plurality of GeoRaster objects, the first spatial index operable to retrieve a GeoRaster object from the first data table based on a relative spatial location of the GeoRaster object, and a primary key index built on the second data table based on the information relating to the block of raster data, the index operable to retrieve a raster object from the second data table based on the information relating to the block of raster data associated with the retrieved raster object.

40 Claims, 10 Drawing Sheets

Fig. 1

SDO_GEORASTER object type:

```
CREATE TYPE sdo_georaster AS OBJECT (
    rasterType NUMBER,
    spatialExtent SDO_GEOMETRY,
    rasterDataTable VARCHAR2(32),
    rasterID NUMBER,
    metadata XMLType);
```

Fig. 2

SDO_RASTER object type:

```
CREATE TYPE sdo_raster AS OBJECT (
    rasterID NUMBER,
    pyramidLevel NUMBER,
    bandBlockNumber NUMBER,
    rowBlockNumber NUMBER,
    columnBlockNumber NUMBER,
    blockMBR SDO_GEOMETRY,
    rasterBlock BLOB);
```

Fig. 3

GeoRaster system data table:

```
CREATE TABLE SDO_GEOR_SYSDATA_TABLE
(
    SDO_OWNER                       VARCHAR2(32),
    GEORASTER_TABLE_NAME            VARCHAR2(32) NOT NULL,
    GEORASTER_COLUMN_NAME           VARCHAR2(1024) NOT NULL,
    GEOR_METADATA_COLUMN_NAME       VARCHAR2(1024),
    RDT_TABLE_NAME                  VARCHAR2(32),
    RASTER_ID                       NUMBER,
    OTHER_TABLE_NAMES               SDO_STRING_ARRAY,
    CONSTRAINT unique_georasters
        PRIMARY KEY (SDO_OWNER, RDT_TABLE_NAME, RASTER_ID)
);
```

USER_SDO_GEOR_SYSDATA view definition:

(
TABLE_NAME VARCHAR2(32),
COLUMN_NAME VARCHAR2(1024),
METADATA_COLUMN_NAME VARCHAR2(1024),
RDT_TABLE_NAME VARCHAR2(32),
RASTER_ID NUMBER,
OTHER_TABLE_NAMES SDO_STRING_ARRAY
);

500 → ALL_SDO_GEOR_SYSDATA view definition:

(
OWNER VARCHAR2(32),
TABLE_NAME VARCHAR2(32),
COLUMN_NAME VARCHAR2(1024),
METADATA_COLUMN_NAME VARCHAR2(1024),
RDT_TABLE_NAME VARCHAR2(32),
RASTER_ID NUMBER,
OTHER_TABLE_NAMES SDO_STRING_ARRAY
);

GEORASTER PHYSICAL DATA MODEL FOR STORING GEOREFERENCED RASTER DATA

CROSS REFERENCE TO RELATED APPLICATIONS

This application claims the benefit of U.S. Provisional Application No. 60/500,461, filed Sep. 5, 2003.

FIELD OF THE INVENTION

The present invention relates to a system and method for handling geographic raster data in a database management system.

BACKGROUND OF THE INVENTION

Information representing geographic features may be stored in databases and retrieved and manipulated using database management functions. Geographic features stored in databases are represented in either vector or raster format. For vector data, points are represented by their explicit x,y,z coordinates. Lines: are strings of points. Areas are represented as polygons whose borders are lines. This kind of vector format can be used to precisely record the location and shape of spatial objects. Instead of representing features by vector data formats, you can represent spatial objects by assigning values to the cells that cover the objects and record the cells as arrays, i.e. raster format. This kind of raster format has less precision, but is best for a lot of spatial analysis.

As a matter of fact, raster data (imagery and gridded data) is the dominant form of spatial information, which includes thematic maps, DEM/DTM, lattice data, remote sensing imagery, photogrammetric photos, scanned maps and graphs, geophysical images, medical images, etc.

Any spatial database management system must deal with the raster data type to provide a complete and efficient solution. Some general needs of broad application groups including:

Traditional GIS and remote sensing applications—users manage their geographic raster and gridded data assets using a scaleable, secure, and robust RDBMS for defense, intelligence, agriculture, natural resource management.

Business applications—leverage raster-based data in conjunction with other basic location data (address, etc.) to inventory and evaluate site locations and to track fixed and/or continuous assets. They include Asset Management and Facilities Management particularly in energy and utilities.

Image and Gridded Raster Data Repositories/Clearinghouses—support for clearinghouse servers that need to ingest, store, and disseminate very large volumes of geoimagery.

SUMMARY OF THE INVENTION

The present invention is a feature of a database management system (DBMS) that lets you store, index, query, analyze, and deliver GeoRaster data, that is, raster image and gridded data and its associated metadata. The present invention provides a raster database management system targeting many domain subjects including remote sensing, photogrammetry, raster GIS, and other geoimaging and general imaging technologies. It also allows users of file-based image processing and raster data applications to benefit from the scalability, security and performance of DBMSs to support the mission critical applications.

In one embodiment of the present invention, in a database management system, a system for handling geographic raster data comprises a first data table including a plurality of GeoRaster objects, each GeoRaster object including a spatial extent geometry and associated metadata, the spatial extent geometry identifying a footprint of a geographic raster data object and associated with at least one block of raster data, a second data table including a plurality of raster objects, each raster object associated with one block of raster data of a GeoRaster object and including information indicating a spatial extent of the block of raster data and information relating to the block of raster data, a first spatial index built on the first data table based on the spatial extent geometry of each of the plurality of GeoRaster objects, the first spatial index operable to retrieve a GeoRaster object from the first data table based on a relative spatial location of the GeoRaster object, and a primary key index built on the second data table based on the information relating to the block of raster data, the index operable to retrieve a raster object from the second data table based on the information relating to the block of raster data associated with the retrieved raster object.

In one aspect of the present invention, each GeoRaster object further comprises raster type information indicating a number of spatial dimensions of the GeoRaster object and band or layer information of the GeoRaster object. Each GeoRaster object further comprises information identifying the second data table for each block of raster data in the GeoRaster object. Each GeoRaster object further comprises information identifying a raster object in the second data table for each block of raster data in the GeoRaster object.

In one aspect of the present invention, each raster object further comprises information matching information identifying a raster object in the second data table in a GeoRaster object. Each raster object further comprises information indicating a resolution of raster data associated with the raster object. Each raster object further comprises information identifying a block of raster data associated with the raster object.

In one aspect of the present invention, the associated metadata comprises object metadata including object description information and object version information, raster metadata including cell depth information, dimensionality information, blocking information, and interleaving information. The associated metadata further comprises spatial reference system information relating to a polynomial transformation for georeferencing. The polynomial transformation is an affine transformation. The associated metadata further comprises information relating to layers in a GeoRaster object. The associated metadata further comprises image/cell attribution information, scaling factor information, color related information, and layer-based attribute information for each layer.

In one aspect of the present invention, the first spatial index comprises an R-Tree index. The second index comprises a B-Tree index.

In one aspect of, the present invention, the system further comprises a second spatial index built on the second data table based on the information indicating a spatial extent of the block of raster data of each of the plurality of raster data objects, the second spatial index operable, to retrieve a raster object from the second data table based on a relative spatial location of a block of raster data associated with the retrieved raster object. The second spatial index comprises a R-Tree index.

In one aspect of the present invention, the system further comprises a trigger operable to perform an action after a data manipulation language operation affecting a GeoRaster object. The data manipulation language operation comprises at least one of inserting a row, updating the GeoRaster object, and deleting a row.

In one aspect of the present invention, the system further comprises a system data table operable to maintain a relationship between the first data table and the second data table. The system further comprises a trigger operable to maintain the system data table and GeoRaster object integrity after a data definition language operation is performed on the first data table. The data definition language operation comprises at least one of a drop operation and a truncate operation.

BRIEF DESCRIPTION OF THE DRAWINGS

FIG. 1 is an exemplary format of a data object, according to the present invention.

FIG. 2 is an exemplary format of a data object, according to the present invention.

FIG. 3 is an exemplary format of a system data table, according to the present invention.

FIG. 4 is an exemplary format of a data view, according to the present invention.

FIG. 5 is an exemplary format of a data view, according to the present invention.

DETAILED DESCRIPTION OF THE PREFERRED EMBODIMENT

Figure 6:
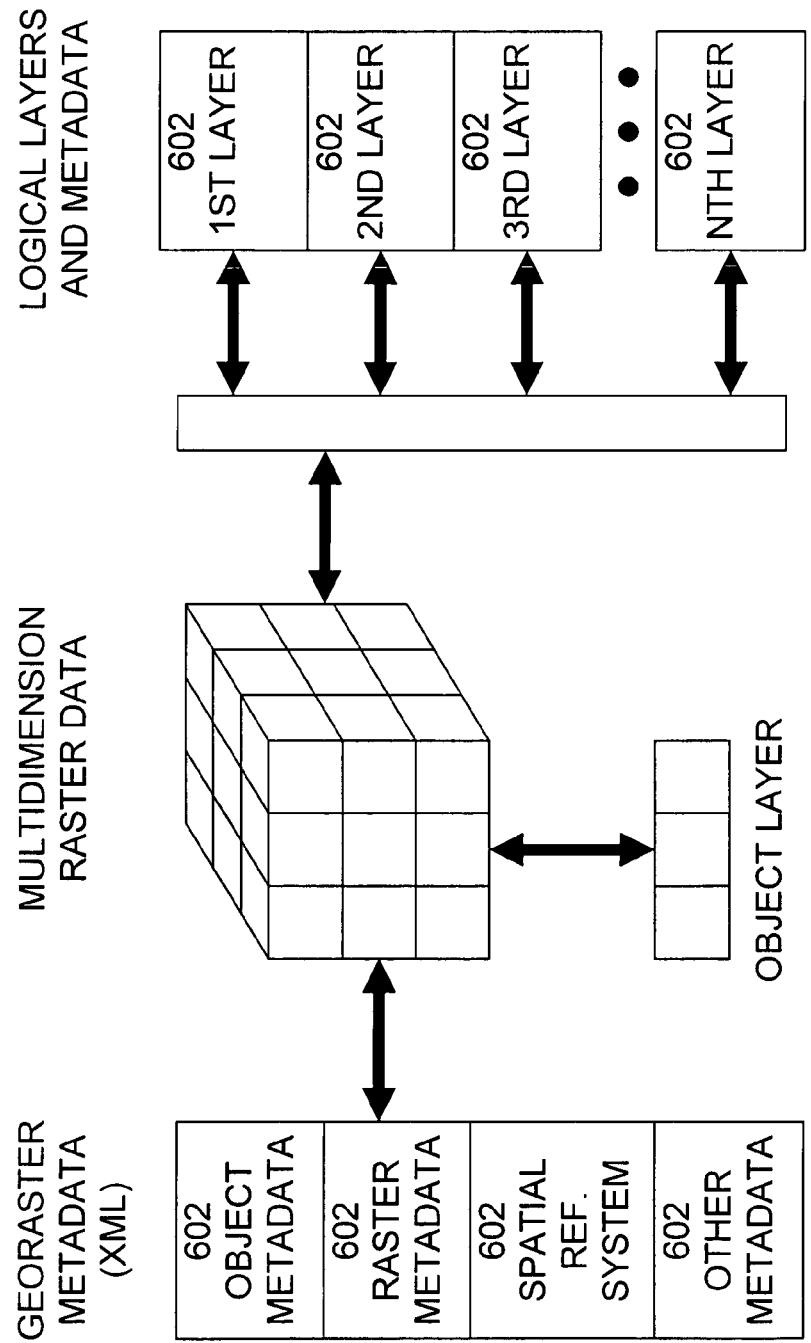
FIG. 6 is an exemplary format of a conceptual data model, according to the present invention.

GeoRaster is a database feature (for example, implemented in the ORACLE SPATIAL® database product) that lets you store, index, query, analyze, and deliver GeoRaster data, that is, raster image and gridded data and its associated metadata. GeoRaster provides spatial data types and an object-relational schema. You can use these data types and schema objects to store multidimensional grid layers and digital images that can be referenced to positions on the Earth's surface or in a local coordinate system.

GeoRaster data is collected and used by a variety of geographic information technologies, including remote sensing, airborne photogrammetry, cartography, and global positioning systems. The collected data is then analyzed by digital image processing systems, computer graphics applications, and computer vision technologies. These technologies use several data formats and create a variety of products. Some examples of the main data sources and uses for GeoRaster, include:

Remote Sensing: Remote sensing obtains information about an area or object through a device that is not physically connected to the area or object. For example, the sensor might be in a satellite, balloon, airplane, boat, or ground station. The sensor device can be any of a variety of devices, including a frame camera, pushbroom (swath) imager, synthetic aperture radar (SAR), hydrographic sonar, or paper or film scanner. Remote sensing applications include environmental assessment and monitoring, global change detection and monitoring, and natural resource surveying.

The data collected by remote sensing is often called geoimagery. The wavelength, number of bands, and other factors determine the radiometric characteristics of the geoimages. The geoimages can be single-band, multiband, or hyperspectral. They can cover any area of the Earth (especially for images sensed by satellite). The temporal resolution can be high, such as with meteorological satellites, making it easier to detect changes. For remote sensing applications, various types of resolution (temporal, spatial, spectral, and radiometric) are often important.

Photogrammetry: Photogrammetry derives metric information from measurements made on photographs. Most photogrammetry applications use airborne photos or high-resolution images collected by satellite remote sensing. In traditional photogrammetry, the main data includes images such as black and white photographs, color photographs, and stereo photograph pairs.

Photogrammetry rigorously establishes the geometric relationship between the image and the object as it existed at the time of the imaging event, and enables you to derive information about the object from its imagery. The relationship between image and object can be established by several means, which can be grouped in two categories: analog (using optical, mechanical, and electronic components) or analytical (where the modeling is mathematical and the processing is digital). Analog solutions are increasingly being replaced by analytical/digital solutions, which are also referred to as softcopy photogrammetry.

The main product from a softcopy photogrammetry systems may include DEMs and orthoimagery. All of that raster data, together with its orientation (georeferencing) information, can be managed by GeoRaster.

Geographic Information Systems: A geographic information system (GIS) captures, stores, and processes geographically referenced information. GIS software has traditionally been either vector-based or raster-based; however, with the GeoRaster feature, Oracle Spatial handles both raster and vector data.

Raster-based GIS systems typically process georectified gridded data. Gridded data can be discrete or continuous. Discrete data, such as political subdivisions, land use and cover, bus routes, and oil wells, is usually stored as integer grids. Continuous data, such as elevation, aspect, pollution concentration, ambient noise level, and wind speed, is usually stored as floating-point grids.

The attributes of a discrete grid layer are stored in a relational table called a value attribute table (VAT). A VAT contains columns specified by the GIS vendor, and may also contain user-defined columns.

Raster GIS systems let you use map algebra operators and functions. Map operators can be grouped in several categories, including arithmetic (such as +, −, *, /, MOD, and NEGATIVE), Boolean (such as NOT, &, |, and !), relational (such as <, <=, ==, >=, >, and <>), logical (such as DIFF, IN, and OVER), bitwise (such as ^, >>, <<, &&, ||, and !!), combinatorial (such as AND, OR, and XOR), and accumulative (such as +=, −+, *=, /=, {=, and }=). Map functions can operate on a cell, a block (neighborhood), a zone, or the entire grid.

Cartography: is the science of creating maps, which are two-dimensional representations of the three-dimensional Earth (or of a non-Earth space using a local coordinate system). Today, maps are digitized or scanned into digital forms, and map production is largely automated. Maps stored on a computer can be queried, analyzed, and updated quickly.

There are many types of maps, corresponding to a variety of uses or purposes. Examples of map types include base (background), thematic, relief (three-dimensional), aspect, cadastral (land use), and inset. Maps usually contain several annotation elements to help explain the map, such as scale bars, legends, symbols (such as the north arrow), and labels (names of cities, rivers, and so on).

Maps can be stored in raster format (and thus can be managed by GeoRaster), in vector format, or in a hybrid format.

Digital Image Processing: Digital image processing is used to process raster data in standard image formats, such as TIF, GIF, JFIF (JPEG), and Sun Raster, as well as in many geoimage formats, such as ERDAS, NITF, and HDF. Image processing techniques are widely used in remote sensing and photogrammetry applications. These techniques are used as needed to enhance, correct, and restore images to facilitate interpretation; to correct for any blurring, distortion, or other degradation that may have occurred; and to classify geo-objects automatically and identify targets. The source and result imagery can be loaded and managed by GeoRaster.

Geology, Geophysics, and Geochemistry: Geology, geophysics, and geochemistry all use digital data and produce digital raster maps that can be managed by GeoRaster.

In geology, the data includes regional geological maps, stratum maps, and rock slide pictures. In engineering geology, 3-D modeling is popular. In geological exploration and petroleum geology, computerized geostratum simulation, synthetic mineral prediction, and 3-D oil field characterization are widely used.

In geophysics, data about gravity, the magnetic field, seismic wave transportation, and other subjects is saved, along with georeferencing information.

In geochemistry, the contents of multiple chemical elements can be analyzed and measured. The triangulated irregular network (TIN) technique is often used to produce raster maps for further analysis, and image processing is widely used.

The invention features a physical data model for Raster data storage and management, called the GeoRaster Physical Data Model. The physical GeoRaster data model includes two object data types for storing raster data and a schema for managing system data. The two object data types are: SDO_GEORASTER 100, shown in FIG. 1, for a raster data and its related metadata, and SDO_RASTER 200, shown in FIG. 2, for each block in the raster data. Each image or gridded raster data is stored in a column of type SDO_GEORASTER, and the blocks in that raster data are stored in a raster data table of type SDO_RASTER.

The SDO_GEORASTER object contains a spatial extent geometry 102 (footprint or coverage extent) and relevant metadata, which are organized in a XML document according to the provided XML Schema. A table containing one or more columns of this object type is called a GeoRaster table. The SDO_RASTER object contains information about a block (tile) of a GeoRaster object, and it uses a BLOB object to store the raster cell data for the block. An object table of this object type is called a raster data table (RDT).

Each SDO_GEORASTER object has a pair of attributes (rasterDataTable 104, rasterID 106) that uniquely identify the RDT and the rows within the RDT that are used to store the raster cell data for the GeoRaster object. GeoRaster uses a system data table SDO_GEOR_SYSDATA_TABLE 300, shown in FIG. 3, to maintain the relationship between GeoRaster tables and their related raster data tables.

Two views, USER_SDO_GEOR_SYSDATA 400, shown in FIG. 4, and ALL_SDO_GEOR_SYSDATA 500, shown in FIG. 5, of the GeoRaster sysdata table are available for every user. To ensure the consistency and integrity of internal GeoRaster tables and data structures, GeoRaster supplies a trigger that performs necessary actions after each of the following data manipulation language (DML) operations affecting a GeoRaster object: insertion of a row, update of a GeoRaster object, and deletion of a row. In addition, two DDL triggers are defined for all users, which maintain the SYSDATA table and GeoRaster object integrity after drop and truncate operations on a GeoRaster table are performed, respectively.

A spatial index (R-Tree) can be built on any GeoRaster table based on the spatial extent geometry attribute of the SDO_GEORASTER data type. A spatial index can also be built on the RDT tables based the blockMBR geometry attribute of the SDO_RASTER data type. A B-tree index is built on the RDT tables based on other attributes of the SDO_RASTER data type except the blockMBR and the rasterBlock columns.

In a preferred embodiment, GeoRaster provides a PL/SQL API that includes more than 100 functions. Mainly the functions are packaged into a PL/SQL package called SDO_GEOR. The API provides the most important functionalities and services for loading, managing, querying, updating, deleting, processing, and exporting GeoRaster objects.

The GeoRaster physical data model is based on a conceptual data model we proposed. It is called the GeoRaster conceptual data model, which is a component-based, logically layered, and multidimensional raster data model. The GeoRaster conceptual data model is illustrated in FIG. 6.

The core data in a raster is a multidimensional matrix of raster cells. Each cell is one element of the matrix, and its value is called the cell value. The matrix has a number of dimensions, a cell depth, and a size for each dimension. The cell depth is the data size of the value of each cell. It also defines the range of all cell values. The cell depth applies to each single cell, not an array of cells. This core raster data set can be blocked for optimal storage, retrieval and processing.

In this data model, two different types of coordinates need to be considered: the coordinates of each pixel (cell) in the raster matrix and the coordinates on the Earth that they represent. Consequently, two types of coordinate systems or spaces are defined: the cell coordinate system and the model coordinate system. The cell coordinate system (also called the raster space) is used to describe pixels in the raster matrix, and its dimensions are (in this order) row, column, and band. The model coordinate system (also called the ground coordinate system or the model space) is used to describe points on the Earth or any other coordinate system associated with an Oracle SRID value. The spatial dimensions of the model coordinate system are (in this order) X and Y, corresponding to the column and row dimensions, respectively, in the cell coordinate system. The logical layers correspond to the band dimension in the cell space. The dimensionality of spaces can be expended to M dimensions.

The data model is logically layered. The core data is called the object layer or layer 0, and consists of one or more logical layers (or sublayers). Assuming the core data has M dimensions, the object layer is M dimensional, but its sublayers are M−1 dimensional. Each sublayer can be further divided into sublayers which are M−2 dimensional, and so on. For example, for multi-channel remote sensing imagery, the layers are used to model the channels or bands of the imagery. In this case, each layer is a two-dimensional matrix of cells that consists of the row dimension and the column dimension.

Figure 7:
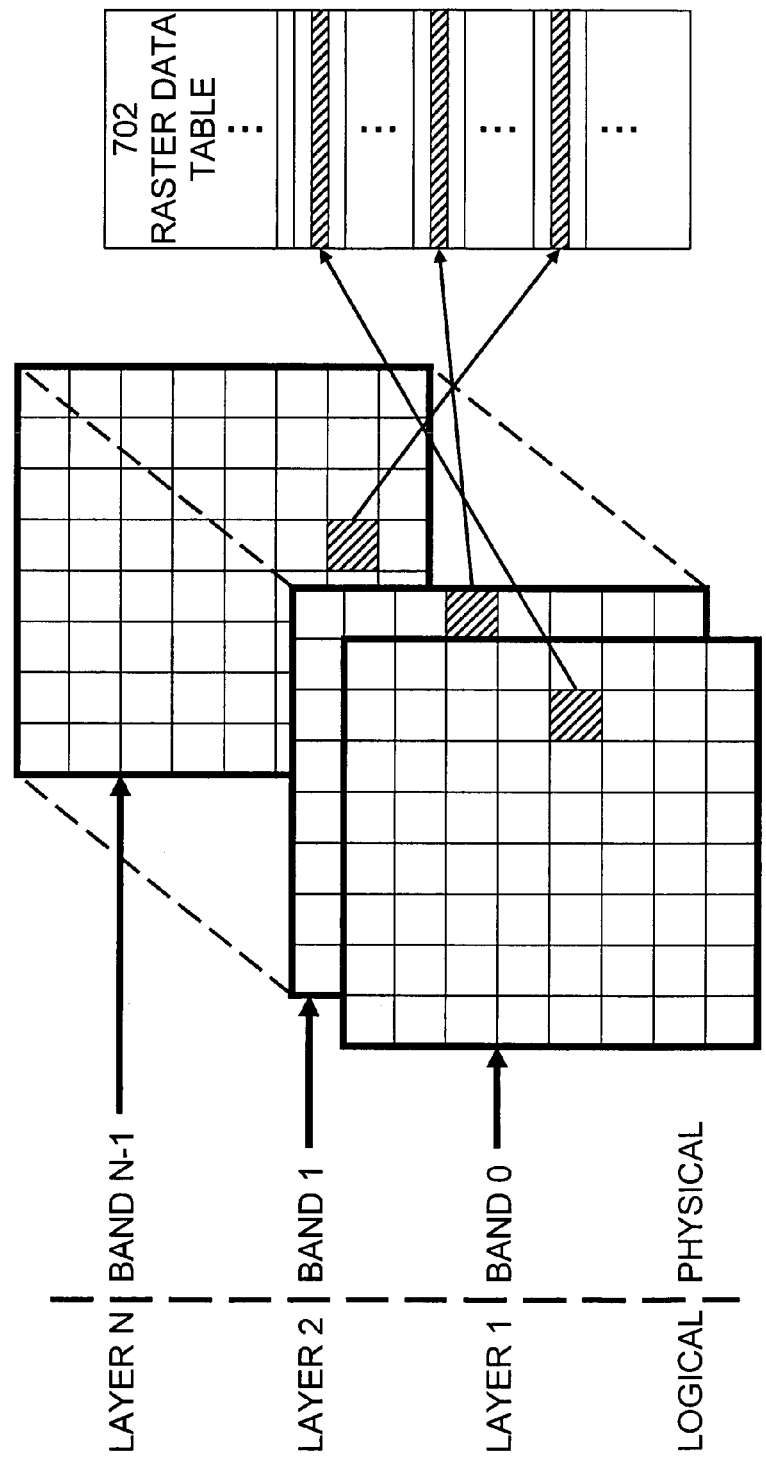
FIG. 7 is an exemplary diagram of a relationship between logical layers in the data model and the physical bands or channels of the source image data.

In GeoRaster, band and layer are different concepts. Band is a physical dimension of the multidimensional raster data set; that is, it is one ordinate in the cell space. For example, the cell space might have the ordinates row, column, and band. Bands are numbered from 0 to n−1, where n is the highest layer number. Layer is a logical concept in the GeoRaster data model. Layers are mapped to bands. Typically, one layer corresponds to one band, and it consists of a two-dimensional matrix of size rowDimensionSize and columnDimensionSize. Layers are numbered from 1 to n; that is, layerNumber=bandNumber+1. In a preferred embodiment, the relationship between logical layers in the GeoRaster data model and the physical bands or channels of the source image data is depicted in FIG. 7. The XML schema allows a more flexible random mapping between layerNumber and bandNumber other than layerNumber=bandNumber+1. A GeoRaster object has specific metadata associated with it. In the GeoRaster data model, metadata is everything but the core cell matrix and it is stored as an XMLType in the database. This metadata includes object metadata such as description and version information. GeoRaster also includes raster metadata for cell depth (1BIT, 32BIT_S, or 64BIT_REAL), dimensionality, blocking, interleaving and other information. Additionally, Spatial Reference System metadata, containing information for the affine transformation or higher-order polynomial transformations required for georeferencing, can also be stored. Additional metadata, such as metadata pertaining to each layer in a GeoRaster object, can be stored in the database as well. If the data is grid data, one or more Value Attribute Tables (VAT) can be used to maintain information about the values stored in each layer (e.g. elevation value, saturation level etc.). In addition, there is a comprehensive suite of optional metadata used to capture and track image/cell attribution, scaling factors, color related information (color map, grayscale), histogram and other layer-based attributes essential for image management and use by client applications.

In summary, the GeoRaster metadata is divided into different components that contain, but are not limited to, the following information:

Object information

Raster information

Spatial reference system information

Date and time (temporal reference system) information

Spectral (band reference system) information

Layer information for each layer

We use XML schema to describe the metadata and related raster physical storage. Appendix A is the GeoRaster metadata XML Schema we defined based on the above conceptual data model and the following physical data model. It provides a detailed description of each metadata item of GeoRaster objects.

In general, the invention features a physical data model for Raster data storage and management, called the GeoRaster Physical Data Model. It's embodied as two spatial data types and an object-relational schema inside Oracle ORDBMS.

Returning now to FIG. 1, an example of a preferred embodiment of an object of SDO_GEORASTER data type 100 is shown. At the top level, one raster data (an image or a grid) is stored in Oracle as an object of SDO_GEORASTER data type 100. A table containing one or more columns of this object type is called a GeoRaster table. A GeoRaster object of this type consists of a multidimensional matrix of cells and the GeoRaster metadata. Most metadata is stored as one attribute 108 of the SDO_GEORASTER type. It is an XML document using the Oracle XMLType data type. The metadata is defined according to the GeoRaster metadata XML schema, which is described in Appendix A. The spatial extent (footprint) of a GeoRaster object is part of the metadata, but it is stored separately as an attribute 102 of the GeoRaster object. This approach allows GeoRaster to take advantage of the spatial geometry type and related capabilities, such as using spatial R-tree indexing on GeoRaster objects. Another attribute of the SDO_GEORASTER type is the rasterType 110, which contains dimensionality information and the data type that can be further defined. More descriptions about preferred embodiments of each attribute follow:

1. rasterType 110

The rasterType attribute 110 must be a 5-digit number in the format [d][b][t][gt], where:

[d] identifies the number of spatial dimensions. Must be 2 for the current release.

[b] indicates band or layer information: 0 means one band or layer; 1 means one or more than one band or layer. Note that the total number of bands or layers is not specified in this field.

[t] is reserved for temporal dimension and should be specified as 0 (zero) currently.

[gt] identifies the 2-digit GeoRaster type, and must be the following:

00 Reserved.

01 Any GeoRaster type. This is the only value supported for the current release. This value causes GeoRaster not to apply any restrictions associated with specific types that might be implemented in future releases.

02–50 Reserved. Each special GeoRaster type will be allocated a number from this range.

51–99 For customer use.

2. spatialExtent 102

The spatialExtent attribute 102 identifies the spatial extent, or footprint, associated with the raster data. The spatial extent is a Spatial geometry of type SDO_GEOMETRY. The spatial extent geometry can be in any coordinate system; The spatial extent geometry can also be in cell space that has a null SRID value. Because of the potential performance benefits of spatial indexing for GeoRaster applications, the geometry is associated with the spatialExtent attribute, rather than being included in the XML metadata attribute.

3. rasterDataTable 104

The rasterDataTable attribute 104 identifies the name of the raster data table. The raster data table must be an object table of type SDO_RASTER. It contains a row of type SDO_RASTER for each raster block that is stored. You must create and (if necessary) drop the raster data table. You should never modify the rows in this table directly, but you can query this table to access the raster data.

4. rasterID 106

The rasterID attribute 106 value is stored in the rows of the raster data table to identify which rows belong to the GeoRaster object. The rasterDataTable attribute and rasterID attribute together uniquely identify the GeoRaster object in the database for a specific schema or user [i.e., for the whole database, (username, rasterDataTable, rasterID) is unique. For one user, (rasterDataTable, rasterID) is unique]. That is, each GeoRaster object has a raster data table, although a raster data table can contain data from multiple GeoRaster objects. You can specify the rasterID and rasterDataTable attributes for new GeoRaster objects, as long as each pair is unique in the database. If you do not specify these values, they are automatically generated when you call SDO_GEOR.init or SDO_GEOR.createBlank function to initialize or create a GeoRaster object.

5. metadata 108

The metadata attribute 108 contains the GeoRaster metadata that is defined by Oracle. The metadata is described by the GeoRaster metadata XML schema, which is documented in Appendix A. The metadata of any GeoRaster object must be validated against this XML schema, and it must also be validated using the SDO_GEOR.validateGeoraster function, which imposes additional restrictions not defined by this XML schema.

The multidimensional matrix of cells is blocked into small subsets for large-scale GeoRaster object storage and optimal retrieval and processing. Blocking can be regular and irregular. For regular blocking, each block is a rectangular and aligned to each other. Each block has the same size. For irregular blocking blocks might have different sizes. Only regular blocking is implemented.

Referring now to FIG. 2, an example of a preferred embodiment of an object table of type SDO_RASTER 200 is shown. All blocks are stored in an object table of type SDO_RASTER 200, which is defined by the GeoRaster Physical Data Model, as shown in FIG. 2. This object table is called raster data table 200, or simply RDT table 200. Each block 202 is stored in the RDT table 200 as a binary large object (BLOB), and a geometry object (of type SDO_GEOMETRY) is used to define the precise extent of the block. The extent geometry is called the attribute 204. One benefit of this attribute is to build a spatial index so that blocks can be quickly retrieved based on their relative spatial location. This also allows the physical data model to block a GeoRaster object into irregular blocks, i.e., blocks can have different sizes. Each row of the table stores only one block and the blocking information related to that block. (This blocking scheme applies to any pyramids also). More descriptions about preferred embodiments of each attribute follow:

1. rasterID 206

The rasterID attribute 206 in the SDO_RASTER object 200 must be a number that matches the rasterID value in its associated SDO_GEORASTER object. The matching of these numbers identifies the raster block as belonging to a specific GeoRaster object.

2. pyramidLevel 208

The pyramidLevel attribute 208 identifies the pyramid level for this block of cells. In a preferred embodiment, the pyramid level is 0 or any positive integer. A pyramid level of 0 indicates the original raster data; that is, there is no reduction in the image resolution and no change in the storage space required. Values greater than 0 (zero) indicate increasingly reduced levels of image resolution and reduced storage space requirements.

3. bandBlockNumber 210

The bandBlockNumber 210 attribute identifies the block number along the band dimension. Only used when the GeoRaster object is regularly blocked.

4. rowBlockNumber 212

The rowBlockNumber attribute 212 identifies the block number along the row dimension. Only used when the GeoRaster object is regularly blocked.

5. columnBlockNumber 214

The columnBlockNumber attribute 214 identifies the block number along the column dimension. Only used when the GeoRaster object is regularly blocked.

6. blockMBR 204

The blockMBR attribute 204 is the geometry (of type SDO_GEOMETRY) for the minimum bounding rectangle (MBR) for this block. The geometry is in cell space (that is, its SRID value is null), and all ordinates are integers. The ordinates represent the minimum row and column and the maximum row and column stored in this block.

7. rasterBlock 202

The rasterBlock attribute 202 contains all raster cell data for this block. The rasterBlock attribute is of type BLOB.

The dimension sizes (along row, column, and band dimensions) may not be evenly divided by their respective block sizes. GeoRaster adds padding to the boundary blocks that do not have enough original cells to be completely filled. The boundary blocks are the end blocks along the positive direction of each dimension. The padding cells have the same cell depth as other cells and have values equal to zero. Padding makes each block have the same BLOB size. Padding applies to all dimensions.

Pyramids are subobjects of a GeoRaster object that represent the raster image or raster data at differing sizes and degrees of resolution. Pyramid levels represent reduced or increased resolution images that require less or more storage space, respectively. A pyramid level of 0 indicates the original raster data. Values greater than 0 (zero) indicate increasingly reduced levels of image resolution and reduced storage space requirements. GeoRaster currently supports only pyramids of reduced resolution by 2 and only applies to row and column dimensions.

The pyramids are stored in the same raster data table as the GeoRaster object. The pyramidLevel attribute in the raster data table identifies all the blocks related to a specific pyramid level. In general, the blocking scheme for each pyramid level is the same as that for the original level (which is defined in the GeoRaster object metadata), except in the following cases:

If the original GeoRaster object is not blocked, that is, if the original cell data is stored in one block (BLOB) of the exact size of the object, the cell data of each pyramid level is stored in one block, and its size is the same as that of the actual pyramid level raster data.

If the original GeoRaster object is blocked (even if blocked as one block), the cell data of each pyramid level is blocked in the same way as for the original level data, and each block is stored in a different BLOB object as long as the maximum dimension size of the actual pyramid level image is larger than the block sizes. However, if lower-resolution pyramids are generated (that is, if both the row and column dimension sizes of the pyramid level are less than or equal to one-half the row block size and column block size, respectively), the cell data of each such pyramid level is stored in one BLOB object and its size is the same as that of the actual pyramid level raster data.

Based on this data model, compression can be applied to each block. But each block will have the same compression scheme.

In the raster space, band dimension stores layers or bands of multispectral imagery. Physically, three types of interleaving are supported: BSQ (band sequential), BIL (band interleaved by line), and BIP (band interleaved by pixel).

Interleaving applies between bands or layers only. Interleaving is limited to the interleaving of cells inside each block of a GeoRaster object. This means GeoRaster always applies blocking on a GeoRaster object first, and then it applies interleaving inside each block independently. However, each block of the same GeoRaster object has the same interleaving type.

In summary, all metadata of a raster object is stored in an SDO_GEORASTER object of a GeoRaster table and all cell data of the raster object is stored in a Raster Data Table of SDO_RASTER object type, which can be optionally blocked into many smaller rectangular blocks. The SDO_GEORASTER object contains a spatial extent geometry (footprint or coverage extent) and relevant metadata. The SDO_RASTER object contains information about a block (tile) of a GeoRaster object, and it uses a BLOB object to store the raster cell data for the block. Each SDO_GEORASTER object has a pair of attributes (rasterDataTable, rasterID) that uniquely identify the RDT and the rows within the RDT that are used to store the raster cell data for the GeoRaster object.

Figure 8:
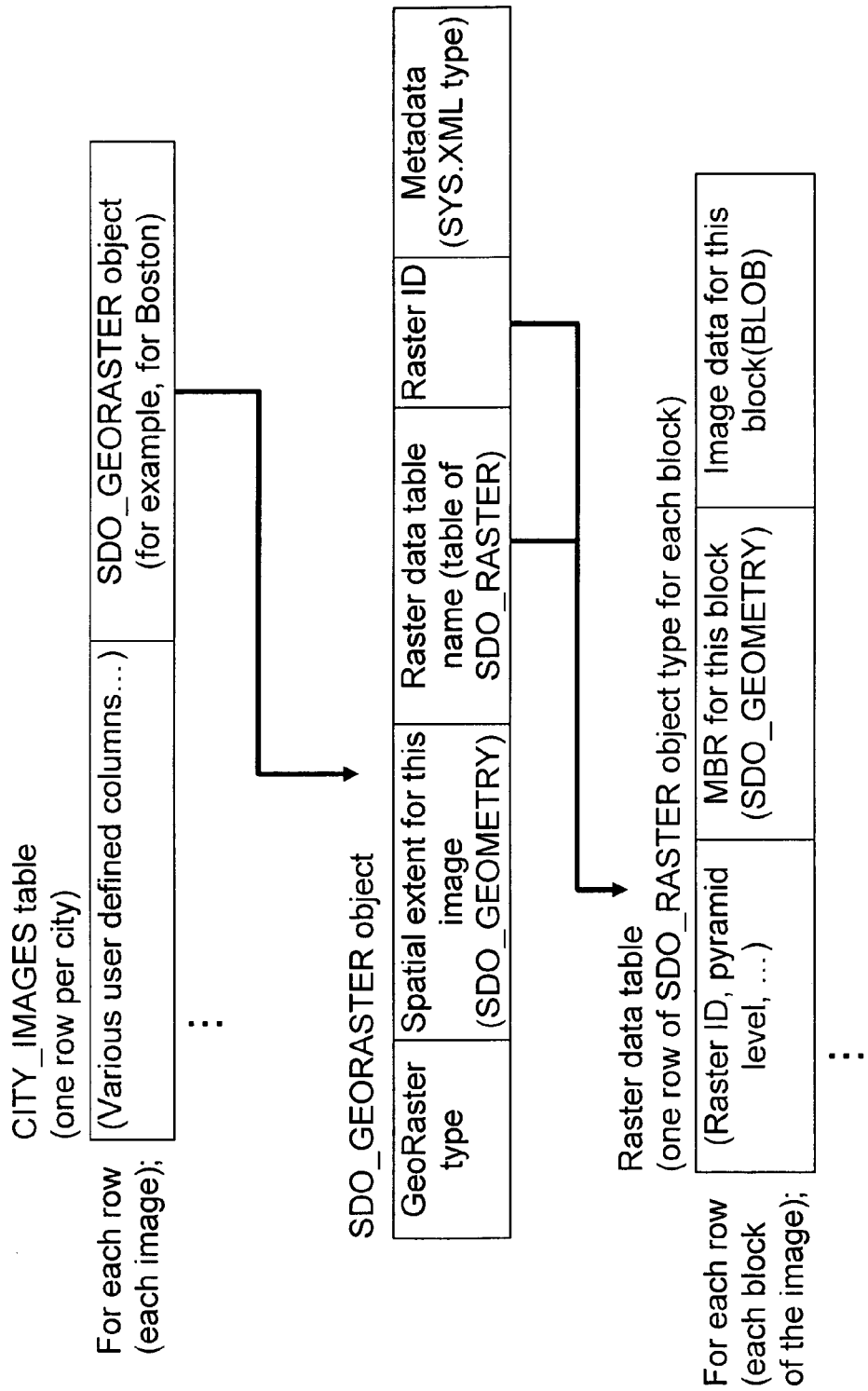
FIG. 8 is an exemplary diagram of the storage of GeoRaster objects, according to the present invention.

Turning now to FIG. 8, an example of a preferred embodiment of the storage of GeoRaster objects is shown, using as an example an image of Boston, Mass. in a table that contains rows with images of various cities.

As shown in FIG. 8:
Each row in the table of city images contains information about the image for a specific city (such as Boston), including an SDO_GEORASTER object.

The SDO_GEORASTER object includes the spatial extent geometry covering the entire area of the image, the metadata, the raster ID, and the name of the raster data table associated with this image.

Each row in the raster data table contains information about a block (or tile) of the image, including the block's minimum bounding rectangle (MBR) and image data (stored as a BLOB).

GeoRaster uses a system data table SDO_GEOR_SYSDATA_TABLE 300 (called the GeoRaster sysdata table) to maintain the relationship between GeoRaster tables and their related raster data tables, as shown in FIG. 3. Two views USER_SDO_GEOR_SYSDATA 400 and ALL_SDO_GEOR_SYSDATA 500 of the GeoRaster sysdata table are available for every user, as shown in FIGS. 4 and 5, respectively. All new GeoRaster objects have to be initialized and a pair of attributes (rasterDataTable, rasterID) has to be assigned to each new GeoRaster object. In the mean time when the new GeoRaster object is inserted into a GeoRaster table, all related information will be automatically inserted into the sysdata table by the GeoRaster DML trigger defined on the GeoRaster table. The uniqueness of the (rasterDataTable, rasterID) pair is enforced by the constraint defined on the sysdata table. More descriptions about preferred embodiments of each column of the sysdata table 300, shown in FIG. 3, and views follow:

1. SDO_OWNER 302

The SDO_OWNER column 302 contains the GeoRaster user/schema name.

2. GEORASTER_TABLE_NAME 304

This column and the TABLE_NAME column in views contain the name of a GeoRaster table that has at least one column of type SDO_GEORASTER.

3. GEORASTER_COLUMN_NAME 306

This column and the COLUMN_NAME column in views contains the name of a column of type SDO_GEORASTER in the GeoRaster table specified in the GEORASTER_TABLE_NAME column.

4. GEOR_METADATA_COLUMN_NAME 308

This column and the METADATA_COLUMN_NAME column in views are reserved for future use. It can be used to contain more metadata complimentary to the metadata attribute of the GeoRaster object.

5. RDT_TABLE_NAME 310

This column and the RDT_TABLE_NAME column in views contain the name of the raster data table associated with the table and column specified in the GEORASTER_TABLE_NAME and GEORASTER_COLUMN_NAME columns.

6. RASTER_ID 312

This column and the RASTER_ID column in views contain a number that, together with the RDT_TABLE_ NAME column value, uniquely identifies each GeoRaster object for a specific schema/user specified in the SDO_OWNER column. In the global database, the SDO_OWNER value, RDT_TABLE_NAME value and RASTER_ID value together must be unique in this GeoRaster sysdata table.

7. OTHER_TABLE_NAMES 314

This column is reserved for future use. It can be used to register other components of a GeoRaster object, such as a VAT table.

To ensure the consistency and integrity of internal GeoRaster tables and data structures, GeoRaster supplies a trigger that performs necessary actions after each of the following data manipulation language (DML) operations affecting a GeoRaster object: insertion of a row, update of a GeoRaster object, and deletion of a row:

After an insert operation, the trigger inserts a row with the GeoRaster table name, GeoRaster column name, raster data table name, and rasterID value into the USER_SDO_GEOR_SYSDATA view. If an identical entry already exists, an exception is raised.

After an update operation, if the new GeoRaster object is null or empty, the trigger deletes the old GeoRaster object. If there is no entry in the USER_SDO_GEOR_SYSDATA view for the old GeoRaster object (that is, if the old GeoRaster object is null), the trigger inserts a row into that view for the new GeoRaster object. If there is an entry in the USER_SDO_GEOR_SYSDATA view for the old GeoRaster object, the trigger updates the information to reflect the new GeoRaster object.

After a delete operation, the trigger deletes raster data blocks for the GeoRaster object in its raster data table, and it deletes the row in the USER_SDO_GEOR_SYSDATA view for the GeoRaster object.

A function called createDMLTrigger in the SDO_GEOR_UTL package is provided. One necessary DML trigger must be created on each unique GeoRaster table and GeoRaster column pair. The necessary DML trigger or triggers must be created immediately after a GeoRaster table is created, and the trigger or triggers must be created before any operations on the table are performed. The following example creates the standard GeoRaster DML trigger for a table named XYZ_GEOR_TAB containing a GeoRaster column named GEOR_COL:

EXECUTEsdo_geor_utl.createDMLTrigger('XYZ_GEOR_TAB','GEOR_COL');

In addition, two DDL triggers are defined for all users, which maintain the sysdata table and GeoRaster object integrity after drop and truncate operations on a GeoRaster table are performed respectively. These triggers make sure the GeoRaster DML trigger on a GeoRaster table is invoked for each row when user drop or truncate the GeoRaster table so that all GeoRaster objects together with their raster blocks are cleanly removed and all entries of the GeoRaster objects in the sysdata table are deleted.

Figure 9:
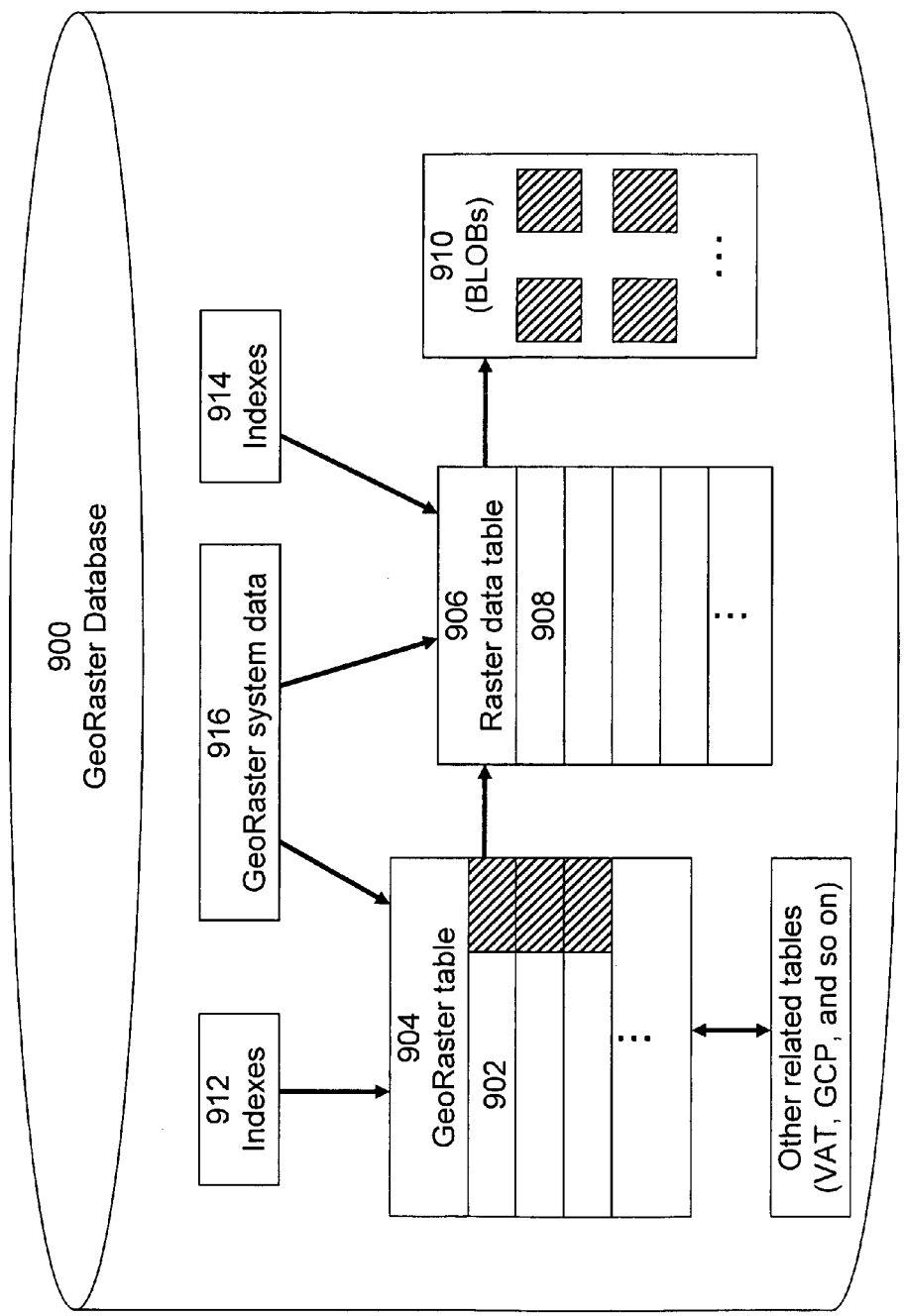
FIG. 9 is an exemplary diagram of physical storage of GeoRaster data and several related objects in a database, according to the present invention.

An example of a preferred embodiment of physical storage of GeoRaster data and several related objects in a database 900 is shown in FIG. 9. Preferably, database 900 is implemented in a database management system As shown in FIG. 9:

Each GeoRaster object, such as object 902, in the GeoRaster table 904 has an associated raster data table, such as table 906, which has an entry for each block of the raster image, such as entry 908.

Each GeoRaster object has a raster data table associated with it. However, a raster data table can store blocks of multiple GeoRaster objects, and GeoRaster objects in a GeoRaster table can be associated with one or multiple raster data tables.

The BLOB 910 with image data for each raster image block is stored separately from the raster data table (which stores the BLOB locator only). You can specify separately storage parameters for the BLOBs.

GeoRaster sysdata table maintains the relationship between the GeoRaster tables and the raster data tables.

Other defined schema objects include SDO_GEOR_SRS for spatial reference system, SDO_GEOR_COLORMAP for colormap of a pseudocolor GeoRaster object, SDO_GEOR_GRAYSCALE for grayscale of a grayscaled GeoRaster object, SDO_GEOR_HISTOGRAM for histogram of a GeoRaster object or layer. But they are not used as persistent data types. They are defined to support query, modify and update of GeoRaster metadata.

A spatial index 912 (R-Tree) can be built on any GeoRaster table based on the spatial extent geometry attribute of the SDO_GEORASTER data type. A spatial index 914 may also be built on the RDT tables based the blockMBR geometry attribute of the SDO_RASTER data type. A B-tree index is built on the RDT tables based on other attributes of the SDO_RASTER data type except the blockMBR and the rasterBlock columns.

In a preferred embodiment, GeoRaster provides a PL/SQL API that includes more than 100 functions. Mainly the functions are packaged into a pl/sql package called SDO_GEOR. The API provides the most important functionalities and services for loading, managing, querying, updating, deleting, processing, and exporting GeoRaster objects. Appendix B provides a general overview of the basic functional infrastructure available in support of GeoRaster.

Figure 10:
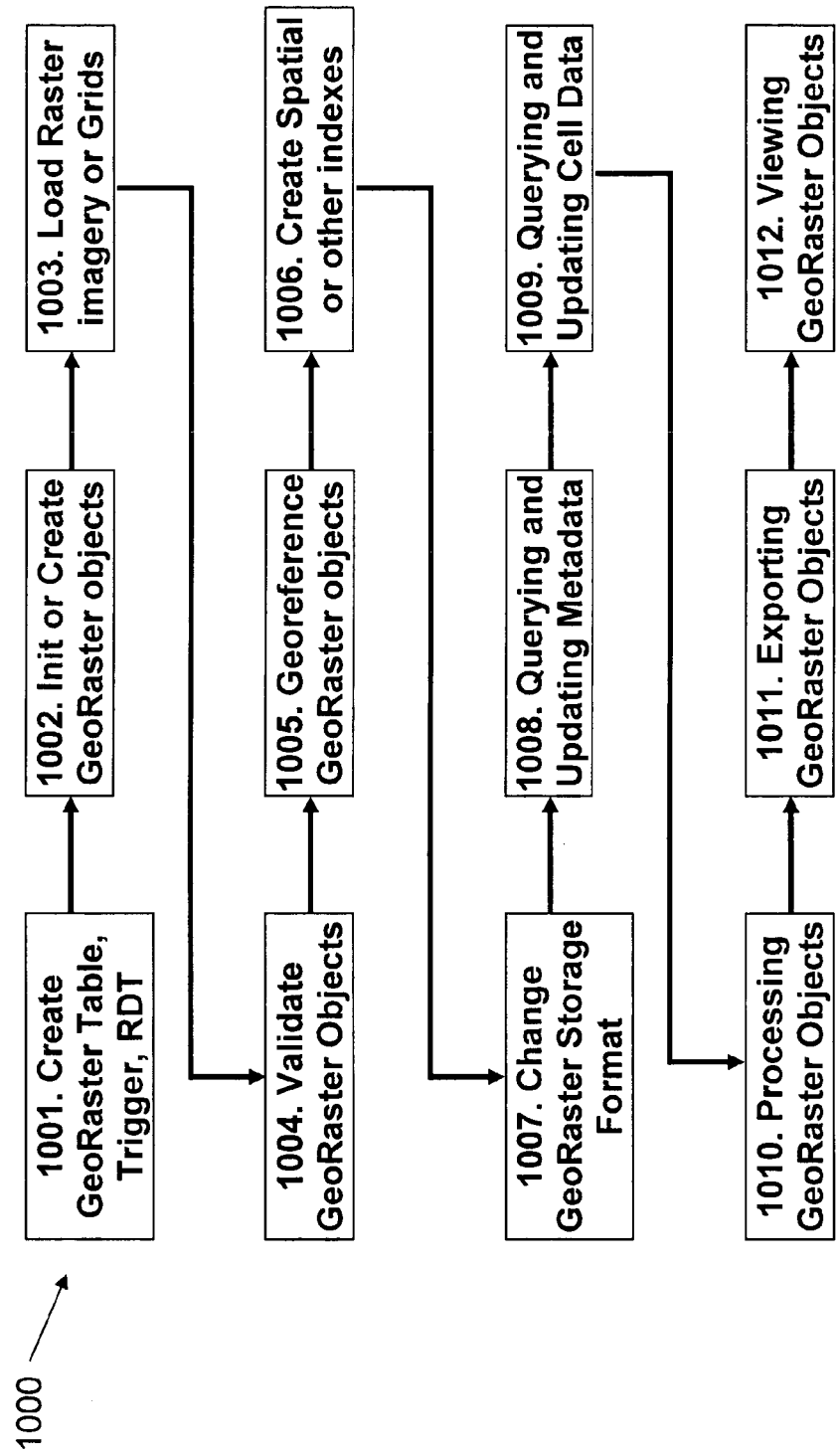
FIG. 10 is an exemplary flow diagram of a workflow of GeoRaster operations, according to the present invention.

Some operations can be called directly in an SQL command. Others must be called in PL/SQL blocks in a standard way. An example of a workflow 1000 of the GeoRaster operations is shown in FIG. 10. The workflow begins with step 1001, in which the GeoRaster table, the trigger, and the RDT are created. In step 1002, GeoRaster objects are created and/or initialized in the GeoRaster table. In step 1003, raster imagery and/or grids are loaded into the GeoRaster data structures. In step 1004, the GeoRaster objects are validated. In step 1005, GeoRaster objects are Georeferenced. In step 1006, spatial or other indexes are created. In step 1007, the format of GeoRaster storage is changed. In step 1008, the GeoRaster metadata is queried and/or updated. In step 1009, the GeoRaster cell data is queried and/or updated. In step 1010, the GeoRaster objects are processed. In step 1011, the GeoRaster objects are exported to other applications, databases, or systems. In step 1012, the GeoRaster objects are viewed. The steps 1005–1012 may be performed in any order, depending on the application. In some applications, some steps may be skipped. For example, if you use the GeoRaster loader tool to load an image, the new GeoRaster object should have been validated and you can skip step 4.

If a World file is loaded together with an image, you can skip step 5 and only set an SRID for the GeoRaster object model coordinate system.

Figure 11:
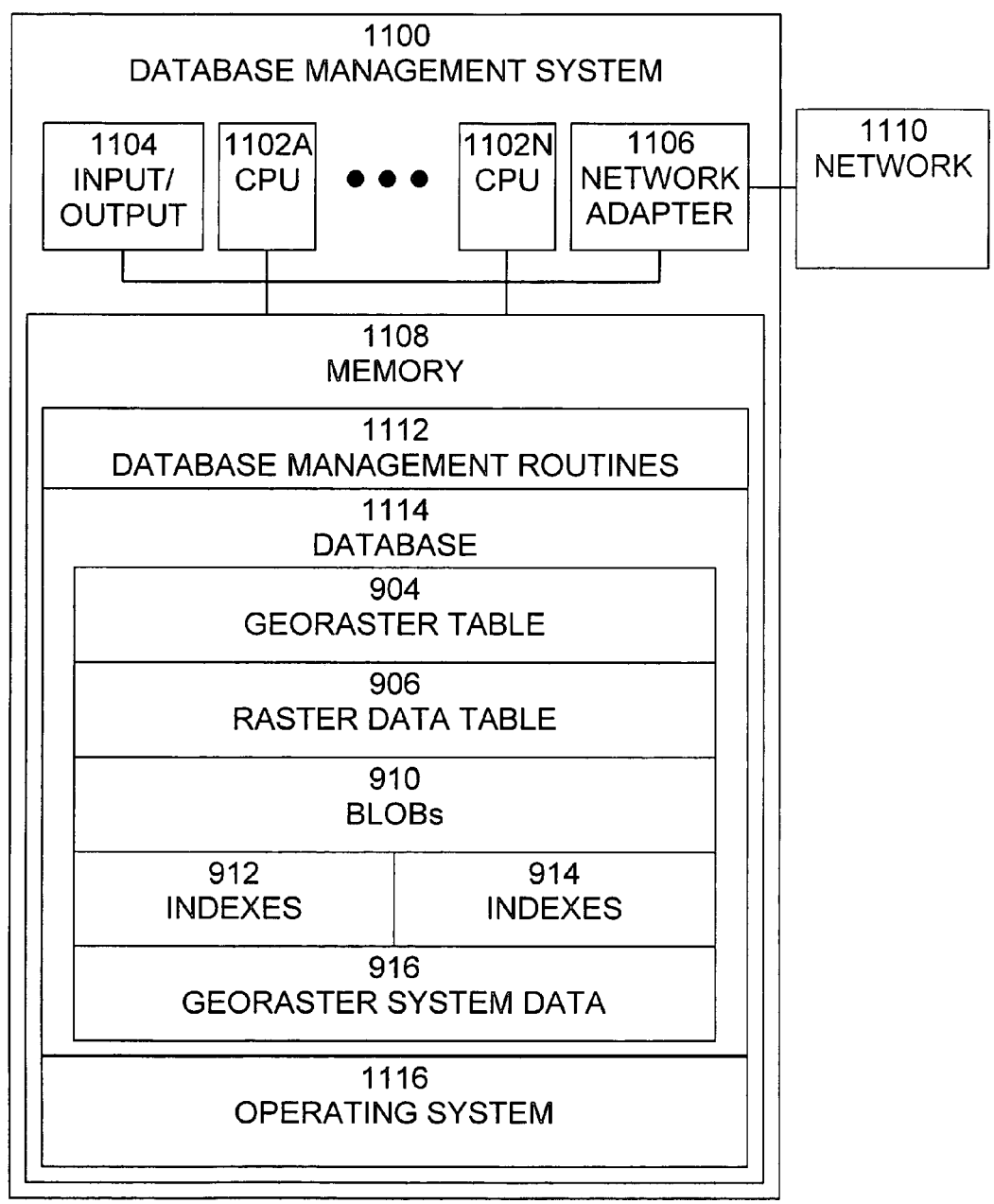
FIG. 11 is a block diagram of an exemplary implementation of a database management system (DBMS), in which the present invention may be implemented.

A block diagram of an exemplary implementation of a database management system (DBMS) 1100, in which the present invention may be implemented, is shown in FIG. 11. DBMS 1100 is typically a programmed general-purpose computer system, such as a personal computer, workstation, server system, and minicomputer or mainframe computer. DBMS 1100 includes one or more processors (CPUs) 1102A–1102N, input/output circuitry 1104, network adapter 1106, and memory 1108. CPUs 1102A–1102N execute program instructions in order to carry out the functions of the present invention. Typically, CPUs 1102A–1102N are one or more microprocessors, such as an INTEL PENTIUM® processor. FIG. 11 illustrates an embodiment in which DBMS 1100 is implemented as a single multi-processor computer system, in which multiple processors 1102A–1102N share system resources, such as memory 1108, input/output circuitry 1104, and network adapter 1106. However, the present invention also contemplates embodiments in which DBMS 1100 is implemented as a plurality of networked computer systems, which may be single-processor computer systems, multi-processor computer systems, or a mix thereof.

Input/output circuitry 1104 provides the capability to input data to, or output data from, DBMS 1100. For example, input/output circuitry may include input devices, such as keyboards, mice, touchpads, trackballs, scanners, etc., output devices, such as video adapters, monitors, printers, etc., and input/output devices, such as, modems, etc. Network adapter 1106 interfaces DBMS 1100 with network 1110. Network 1110 may include one or more standard local area networks (LAN) or wide area networks (WAN), such as Ethernet, Token Ring, the Internet, or a private or proprietary LAN/WAN.

Memory 1108 stores program instructions that are executed by, and data that are used and processed by, CPU 1102 to perform the functions of DBMS 1100. Memory 1108 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

In the example shown in FIG. 11, memory 1108 includes database management routines 1112, database 1114, and operating system 1116. Database management routines 1112 include software routines that provide the database management functionality of DBMS 1100. Database management routines 1112 may include an SQL interface that accepts database queries using the SQL database query language, converts the queries to a series of database access commands, calls database processing routines to perform the series of database access commands, and returns the results of the query to the source of the query. For example, in an embodiment in which DBMS 1100 is a proprietary DBMS, such as the ORACLE® DBMS, SQL interface 108 may support one or more particular versions of SQL or extensions to SQL, such as the ORACLE® PL/SQL extension to SQL.

Database 1114 includes a collection of information organized in such a way that computer software can select, store, and retrieve desired pieces of data. Typically, database 1114 includes a plurality of data tables, such as georaster table 904 and raster data table 906, a plurality of indexes, such as indexes 912 and 914, and other data, such as BLOBs 910 and georaster system data 916.

In addition, as shown in FIG. 11, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, OS/2®, and WINDOWS®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

ORACLE CONFIDENTIAL

Appendix A. GeoRaster Metadata XML Schema

```xml
<?xml version="1.0" encoding="UTF-8"?>
<!-- Oracle GeoRaster Metadata Schema -->
<xsd:schema targetNamespace="http://xmlns.oracle.com/spatial/georaster"
xmlns="http://xmlns.oracle.com/spatial/georaster" xmlns:xsd="http://www.w3.org/2001/XMLSchema"
elementFormDefault="qualified" version="0.0">
    <xsd:annotation>
        <xsd:documentation>==================================================
            This is the XML Schema defining the metadata of Oracle GeoRaster object type
                It consists of two parts: data type definitions and its element content
                    Part 1: Data Types
                        Part 1.1: Data Types for Object Info
                        Part 1.2: Data Types for Raster Info
                        Part 1.3: Data Types for Spatial-Temporal-Band Reference Systems
                            Part 1.3.1: Data Types for Raster Spatial Reference Systems
                            Part 1.3.2: Data Types for Raster Temporal Reference Systems
                        Part 1.3.3: Data Types for Raster Band Reference Systems
                        Part 1.4: Data Types for Layer Metadata
                    Part 2: GeoRaster Metadata Elements or Content Structure
        ==================================================
        </xsd:documentation>
    </xsd:annotation>
    <xsd:annotation>
        <xsd:documentation> ==============================================
                                        Part 1:     Data Types
            ==============================================
        </xsd:documentation>
    </xsd:annotation>
    <xsd:annotation>
        <xsd:documentation> ==============================
                        Part 1.1: Data Types for Object Info
            ==============================
        </xsd:documentation>
    </xsd:annotation>
    <xsd:complexType name="objectDescriptionType">
        <xsd:sequence>
            <xsd:element name="rasterType" type="xsd:integer"/>
            <xsd:element name="ID" type="xsd:string" minOccurs="0"/>
            <xsd:element name="description" type="xsd:string" minOccurs="0"
maxOccurs="unbounded"/>
            <xsd:element name="majorVersion" type="xsd:string" minOccurs="0"/>
            <xsd:element name="minorVersion" type="xsd:string" minOccurs="0"/>
            <xsd:element name="isBlank" type="xsd:boolean" default="false"/>
            <xsd:element name="blankCellValue" type="xsd:double" minOccurs="0"/>
            <xsd:element name="defaultRed" type="xsd:positiveInteger" minOccurs="0"/>
            <xsd:element name="defaultGreen" type="xsd:positiveInteger" minOccurs="0"/>
            <xsd:element name="defaultBlue" type="xsd:positiveInteger" minOccurs="0"/>
            <xsd:any minOccurs="0" maxOccurs="unbounded"/>
        </xsd:sequence>
    </xsd:complexType>
    <xsd:annotation>
        <xsd:documentation> ==============================
                        Part 1.2: Data Types for Raster Info
            ==============================
        </xsd:documentation>
    </xsd:annotation>
    <xsd:simpleType name="cellRepresentationType">
        <xsd:restriction base="xsd:string">
            <xsd:enumeration value="POINT"/>
            <xsd:enumeration value="SEGMENT"/>
            <xsd:enumeration value="TRIANGLE"/>
            <xsd:enumeration value="SQUARE"/>
            <xsd:enumeration value="RECTANGLE"/>
            <xsd:enumeration value="CUBE"/>
            <xsd:enumeration value="TETRAHEDRON"/>
            <xsd:enumeration value="HEXAHEDRON"/>
            <xsd:enumeration value="UNDEFINED"/>
        </xsd:restriction>
    </xsd:simpleType>
    <xsd:simpleType name="cellDepthType">
        <xsd:restriction base="xsd:string">
            <xsd:enumeration value="1BIT"/>
            <xsd:enumeration value="2BIT"/>
            <xsd:enumeration value="4BIT"/>
            <xsd:enumeration value="8BIT_U"/>
            <xsd:enumeration value="8BIT_S"/>
            <xsd:enumeration value="16BIT_U"/>
            <xsd:enumeration value="16BIT_S"/>
            <xsd:enumeration value="32BIT_U"/>
            <xsd:enumeration value="32BIT_S"/>
            <xsd:enumeration value="32BIT_REAL"/>
            <xsd:enumeration value="64BIT_REAL"/>
            <xsd:enumeration value="64BIT_COMPLEX"/>
```

Oracle No. OID-2003-263-01

ORACLE CONFIDENTIAL

```xml
                        <xsd:enumeration value="128BIT_COMPLEX"/>
                </xsd:restriction>
        </xsd:simpleType>
        <xsd:simpleType name="supportedDimensionNumber">
                <xsd:restriction base="xsd:integer">
                        <xsd:minInclusive value="2"/>
                        <xsd:maxInclusive value="3"/>
                </xsd:restriction>
        </xsd:simpleType>
        <xsd:simpleType name="cellDimensionType">
                <xsd:annotation>
                        <xsd:documentation>
                           The "Band" dimension can be treated as any other semantic dimension
                           or any "Layer" if not remote sensing imagery or photographs
                </xsd:documentation>
                </xsd:annotation>
                <xsd:restriction base="xsd:string">
                        <xsd:enumeration value="ROW"/>
                        <xsd:enumeration value="COLUMN"/>
                        <xsd:enumeration value="VERTICAL"/>
                        <xsd:enumeration value="BAND"/>
                        <xsd:enumeration value="TEMPORAL"/>
                </xsd:restriction>
        </xsd:simpleType>
        <xsd:complexType name="cellDimensionSizeType">
                <xsd:sequence>
                        <xsd:element name="size" type="xsd:positiveInteger" default="1"/>
                </xsd:sequence>
                <xsd:attribute name="type" type="cellDimensionType" use="required"/>
        </xsd:complexType>
        <xsd:complexType name="cellCoordinateType">
                <xsd:sequence>
                        <xsd:element name="row" type="xsd:integer" default="0"/>
                        <xsd:element name="column" type="xsd:integer" default="0"/>
                        <xsd:element name="vertical" type="xsd:integer" minOccurs="0"/>
                        <xsd:element name="band" type="xsd:integer" minOccurs="0"/>
                        <xsd:element name="temporal" type="xsd:integer" minOccurs="0"/>
                        <xsd:any minOccurs="0" maxOccurs="unbounded"/>
                </xsd:sequence>
        </xsd:complexType>
        <xsd:simpleType name="compressionType">
                <xsd:restriction base="xsd:string">
                        <xsd:enumeration value="NONE"/>
                        <xsd:enumeration value="RLE"/>
                </xsd:restriction>
        </xsd:simpleType>
        <xsd:complexType name="compressionDescriptionType">
                <xsd:sequence>
                        <xsd:element name="type" type="compressionType" default="NONE"/>
                        <xsd:any minOccurs="0" maxOccurs="unbounded"/>
                </xsd:sequence>
        </xsd:complexType>
        <xsd:simpleType name="blockingType">
                <xsd:restriction base="xsd:string">
                        <xsd:enumeration value="NONE"/>
                        <xsd:enumeration value="REGULAR"/>
                </xsd:restriction>
        </xsd:simpleType>
        <xsd:complexType name="blockingDescriptionType">
                <xsd:sequence>
                        <xsd:element name="type" type="blockingType" default="NONE"/>
                        <xsd:element name="totalRowBlocks" type="xsd:positiveInteger" default="1"/>
                        <xsd:element name="totalColumnBlocks" type="xsd:positiveInteger" default="1"/>
                        <xsd:element name="totalBandBlocks" type="xsd:positiveInteger" default="1"
minOccurs="0"/>
                        <xsd:element name="rowBlockSize" type="xsd:positiveInteger"/>
                        <xsd:element name="columnBlockSize" type="xsd:positiveInteger"/>
                        <xsd:element name="bandBlockSize" type="xsd:positiveInteger" minOccurs="0"/>
                        <xsd:any minOccurs="0" maxOccurs="unbounded"/>
                </xsd:sequence>
        </xsd:complexType>
        <xsd:simpleType name="cellInterleavingType">
                <xsd:restriction base="xsd:string">
                        <xsd:enumeration value="BSQ"/>
                        <xsd:enumeration value="BIL"/>
                        <xsd:enumeration value="BIP"/>
                </xsd:restriction>
        </xsd:simpleType>
        <xsd:simpleType name="pyramidType">
                <xsd:restriction base="xsd:string">
                        <xsd:enumeration value="NONE"/>
                        <xsd:enumeration value="DECREASE"/>
                        <xsd:enumeration value="INCREASE"/>
                        <xsd:enumeration value="BIDIRECTION"/>
                </xsd:restriction>
        </xsd:simpleType>
```

Oracle No. OID-2003-263-01

```xml
<xsd:simpleType name="resamplingType">
        <xsd:restriction base="xsd:string">
                <xsd:enumeration value="NN"/>
                <xsd:enumeration value="BILINEAR"/>
                <xsd:enumeration value="CUBIC"/>
                <xsd:enumeration value="AVERAGE4"/>
                <xsd:enumeration value="AVERAGE16"/>
        </xsd:restriction>
</xsd:simpleType>
<xsd:complexType name="pyramidDescriptionType">
        <xsd:sequence>
                <xsd:element name="type" type="pyramidType" default="NONE"/>
                <xsd:element name="resampling" type="resamplingType" default="NN" minOccurs="0"/>
                <xsd:element name="maxLevel" type="xsd:nonNegativeInteger" default="0" minOccurs="0"/>
                <xsd:any minOccurs="0" maxOccurs="unbounded"/>
        </xsd:sequence>
</xsd:complexType>
<xsd:complexType name="rasterDescriptionType">
        <xsd:sequence>
                <xsd:element name="cellRepresentation" type="cellRepresentationType" default="UNDEFINED"/>
                <xsd:element name="cellDepth" type="cellDepthType" default="8BIT_U"/>
                <xsd:element name="NODATA" type="xsd:double" minOccurs="0"/>
                <xsd:element name="totalDimensions" type="supportedDimensionNumber" default="2"/>
                <xsd:element name="dimensionSize" type="cellDimensionSizeType" maxOccurs="5"/>
                <xsd:element name="ULTCoordinate" type="cellCoordinateType"/>
                <xsd:element name="blocking" type="blockingDescriptionType"/>
                <xsd:element name="interleaving" type="cellInterleavingType" default="BSQ"/>
                <xsd:element name="pyramid" type="pyramidDescriptionType"/>
                <xsd:element name="compression" type="compressionDescriptionType"/>
                <xsd:any minOccurs="0" maxOccurs="unbounded"/>
        </xsd:sequence>
</xsd:complexType>
<xsd:annotation>
        <xsd:documentation>==============================================================
                    Part 1.3.1: Data Types for GeoRaster Spatial Reference System Spatial extent (footprint) is recorded as an attribute of georaster object.
                    Its type is SDO_GEOMETRY. So it is not included in the metadata
                    The cell space coordinates are named as (row, column, vertical)
                    The model space coordinates are named as (x, y, z)
                    Spatial unit information is stored in the WKT of the specified SRID
                    ==============================================================
        </xsd:documentation>
</xsd:annotation>
<xsd:simpleType name="modelDimensionType">
        <xsd:annotation>
                <xsd:documentation>
                    The following "S" means "Spectral" for remote sensing imagery
                    Any of X, Y and Z can be horizontal or vertical or any other spatial direction
                    (depending on user interpretation in "modelDimensionDescription")
                </xsd:documentation>
        </xsd:annotation>
        <xsd:restriction base="xsd:string">
                <xsd:enumeration value="X"/>
                <xsd:enumeration value="Y"/>
                <xsd:enumeration value="Z"/>
                <xsd:enumeration value="T"/>
                <xsd:enumeration value="S"/>
        </xsd:restriction>
</xsd:simpleType>
<xsd:complexType name="resolutionType">
        <xsd:sequence>
                <xsd:element name="resolution" type="xsd:double" default="1"/>
        </xsd:sequence>
        <xsd:attribute name="dimensionType" type="modelDimensionType" use="required"/>
</xsd:complexType>
<xsd:simpleType name="doubleNumberListType">
        <xsd:list itemType="xsd:double"/>
</xsd:simpleType>
<xsd:complexType name="polynomialType">
        <xsd:sequence>
                <xsd:element name="polynomialCoefficients" type="doubleNumberListType"/>
        </xsd:sequence>
        <xsd:attribute name="pType" type="xsd:nonNegativeInteger" use="optional" default="1"/>
        <xsd:attribute name="nVars" type="xsd:nonNegativeInteger" use="required"/>
        <xsd:attribute name="order" type="xsd:nonNegativeInteger" use="required"/>
        <xsd:attribute name="nCoefficients" type="xsd:nonNegativeInteger" use="required"/>
        <xsd:anyAttribute/>
</xsd:complexType>
<xsd:complexType name="rationalPolynomialType">
        <xsd:annotation>
                <xsd:documentation>
                    row       = pPolynomial(x, y, z) / qPolynomial(x, y, z)
```

ORACLE CONFIDENTIAL

```
                column = rPolynomial(x, y, z) / sPolynomial(x, y, z)
            </xsd:documentation>
        </xsd:annotation>
        <xsd:sequence>
            <xsd:element name="pPolynomial" type="polynomialType"/>
            <xsd:element name="qPolynomial" type="polynomialType"/>
            <xsd:element name="rPolynomial" type="polynomialType"/>
            <xsd:element name="sPolynomial" type="polynomialType"/>
            <xsd:any minOccurs="0" maxOccurs="unbounded"/>
        </xsd:sequence>
        <xsd:attribute name="rowOff" type="xsd:double" use="required"/>
        <xsd:attribute name="columnOff" type="xsd:double" use="required"/>
        <xsd:attribute name="xOff" type="xsd:double" use="required"/>
        <xsd:attribute name="yOff" type="xsd:double" use="required"/>
        <xsd:attribute name="zOff" type="xsd:double" use="required"/>
        <xsd:attribute name="rowScale" type="xsd:double" use="required"/>
        <xsd:attribute name="columnScale" type="xsd:double" use="required"/>
        <xsd:attribute name="xScale" type="xsd:double" use="required"/>
        <xsd:attribute name="yScale" type="xsd:double" use="required"/>
        <xsd:attribute name="zScale" type="xsd:double" use="required"/>
        <xsd:attribute name="rowRMS" type="xsd:double" use="optional"/>
        <xsd:attribute name="columnRMS" type="xsd:double" use="optional"/>
        <xsd:attribute name="totalRMS" type="xsd:double" use="optional"/>
        <xsd:anyAttribute/>
    </xsd:complexType>
    <xsd:simpleType name="rasterSpatialReferenceModelType">
        <xsd:restriction base="xsd:string">
            <xsd:enumeration value="RigorousModel"/>
            <xsd:enumeration value="StoredFunction"/>
            <xsd:enumeration value="FunctionalFitting"/>
        </xsd:restriction>
    </xsd:simpleType>
    <xsd:complexType name="rasterSpatialReferenceSystemType">
        <xsd:sequence>
            <xsd:element name="isReferenced" type="xsd:boolean" default="false"/>
            <xsd:element name="isRectified" type="xsd:boolean" minOccurs="0"/>
            <xsd:element name="isOrthoRectified" type="xsd:boolean" minOccurs="0"/>
            <xsd:element name="description" type="xsd:string" minOccurs="0"/>
            <xsd:element name="SRID" type="xsd:nonNegativeInteger" default="0"/>
            <xsd:element name="verticalSRID" type="xsd:integer" minOccurs="0"/>
            <xsd:element name="modelDimensionDescription" type="xsd:string" minOccurs="0"/>
            <xsd:element name="spatialResolution" type="resolutionType" minOccurs="0" maxOccurs="3"/>
            <xsd:element name="spatialTolerance" type="xsd:double" minOccurs="0"/>
            <xsd:element name="modelCoordinateLocation" minOccurs="0">
                <xsd:simpleType>
                    <xsd:restriction base="xsd:string">
                        <xsd:enumeration value="CENTER"/>
                        <xsd:enumeration value="UPPERLEFT"/>
                    </xsd:restriction>
                </xsd:simpleType>
            </xsd:element>
            <xsd:element name="modelType" type="rasterSpatialReferenceModelType" minOccurs="0" maxOccurs="3"/>
            <xsd:element name="polynomialModel" type="rationalPolynomialType" minOccurs="0"/>
            <xsd:element name="gcpTableName" type="xsd:string" minOccurs="0"/>
            <xsd:any minOccurs="0" maxOccurs="unbounded"/>
        </xsd:sequence>
    </xsd:complexType>
    <xsd:annotation>
        <xsd:documentation> =================================================
                Part 1.3.2: Data Types for GeoRaster Temporal Reference System The TRS will be modeled by formulas in the future
                =================================================
        </xsd:documentation>
    </xsd:annotation>
    <xsd:complexType name="rasterTemporalReferenceSystemType">
        <xsd:sequence>
            <xsd:element name="isReferenced" type="xsd:boolean" default="false"/>
            <xsd:element name="description" type="xsd:string" minOccurs="0"/>
            <xsd:element name="beginDateTime" type="xsd:dateTime" minOccurs="0"/>
            <xsd:element name="endDateTime" type="xsd:dateTime" minOccurs="0"/>
            <xsd:element name="temporalResolutionDescription" type="xsd:string" minOccurs="0"/>
            <xsd:any minOccurs="0" maxOccurs="unbounded"/>
        </xsd:sequence>
    </xsd:complexType>
    <xsd:annotation>
        <xsd:documentation> =================================================
                Part 1.3.3: Data Types for GeoRaster Band Reference System For multispectral remote sensing images, each band is optionally
                described in the layerDescriptionType
                The BRS is modeled by formulas for hyperspectral imagery
                (based on number of spectral segments, min and max wavelength
                and number of bands for each segment)
```

Oracle No. OID-2003-263-01

ORACLE CONFIDENTIAL

```
                            Detailed radiometric info will be added in the future
                        ================================================
        </xsd:documentation>
    </xsd:annotation>
    <xsd:simpleType name="wavelengthUnit">
        <xsd:restriction base="xsd:string">
            <xsd:enumeration value="METER"/>
            <xsd:enumeration value="MILLIMETER"/>
            <xsd:enumeration value="MICROMETER"/>
            <xsd:enumeration value="NANOMETER"/>
        </xsd:restriction>
    </xsd:simpleType>
    <xsd:complexType name="extentType">
        <xsd:sequence>
            <xsd:element name="min" type="xsd:double"/>
            <xsd:element name="max" type="xsd:double"/>
        </xsd:sequence>
    </xsd:complexType>
    <xsd:complexType name="segmentationDataType">
        <xsd:sequence>
            <xsd:element name="totalSegNumber" type="xsd:positiveInteger" default="1"/>
            <xsd:element name="firstSegNumber" type="xsd:integer" default="1"/>
            <xsd:element name="extent" type="extentType"/>
        </xsd:sequence>
    </xsd:complexType>
    <xsd:complexType name="bandReferenceType">
        <xsd:sequence>
            <xsd:element name="bands" type="segmentationDataType" minOccurs="0" maxOccurs="unbounded"/>
            <xsd:any minOccurs="0" maxOccurs="unbounded"/>
        </xsd:sequence>
    </xsd:complexType>
    <xsd:complexType name="rasterBandReferenceSystemType">
        <xsd:sequence>
            <xsd:element name="isReferenced" type="xsd:boolean" default="false"/>
            <xsd:element name="description" type="xsd:string" minOccurs="0"/>
            <xsd:element name="radiometricResolutionDescription" type="xsd:string" minOccurs="0"/>
            <xsd:element name="spectralUnit" type="wavelengthUnit" default="MICROMETER"/>
            <xsd:element name="spectralTolerance" type="xsd:double" minOccurs="0"/>
            <xsd:element name="spectralResolutionDescription" type="xsd:string" minOccurs="0"/>
            <xsd:element name="minSpectralResolution" type="resolutionType" minOccurs="0"/>
            <xsd:element name="spectralExtent" type="extentType"/>
            <xsd:element name="bandReference" type="bandReferenceType" minOccurs="0"/>
            <xsd:any minOccurs="0" maxOccurs="unbounded"/>
        </xsd:sequence>
    </xsd:complexType>
    <xsd:annotation>
        <xsd:documentation> ================================================
                            Part 1.4: Data Types for Layer Metadata For each sub-layer the layerNumber is a positive integer, i.e., layers are
                            logically numbered from 1 to n if the size of the specified layerDimension is n.
                            The layerDimensionOrdinate of each sublayer must be in the range of the
                            dimension and must be in the order of band ordinates.
                            For objectLayer, the layerNumber should be 0 but its layerDimensionOrdinate
                            is not used.
                        ================================================
        </xsd:documentation>
    </xsd:annotation>
    <xsd:complexType name="scalingFunctionType">
        <xsd:annotation>
            <xsd:documentation>
                value = (a0 + a1 * cellValue) / (b0 + b1 * cellValue)
            </xsd:documentation>
        </xsd:annotation>
        <xsd:sequence>
            <xsd:element name="a0" type="xsd:double" default="1"/>
            <xsd:element name="a1" type="xsd:double" default="0"/>
            <xsd:element name="b0" type="xsd:double" default="1"/>
            <xsd:element name="b1" type="xsd:double" default="0"/>
            <xsd:any minOccurs="0" maxOccurs="unbounded"/>
        </xsd:sequence>
    </xsd:complexType>
    <xsd:simpleType name="binType">
        <xsd:annotation>
            <xsd:documentation>
                LINEAR bin function:
                    binNumber = numbins * (cellValue - min) / (max - min) + firstBinNumber
                    if (binNumber less than 0) binNumber = firstBinNumber
                    if (binNumber greater than or equal to numbins) binNumber = numbins + firstBinNumber - 1
```

Oracle No. OID-2003-263-01

ORACLE CONFIDENTIAL

```
                LOGARITHM bin function:
                        binNumber = numbins * (ln (1.0 + ((cellValue - min)/(max - min)))/ ln (2.0)) +
firstBinNumber
                        if (binNumber less than 0) binNumber = firstBinNumber
                        if (binNumber greater than or equal to numbins) binNumber = numbins +
firstBinNumber - 1
                EXPLICIT bin function means explicit (or direct) value (or value range)
                        for each bin and it will be stored in a table
        </xsd:documentation>
        </xsd:annotation>
        <xsd:restriction base="xsd:string">
                <xsd:enumeration value="LINEAR"/>
                <xsd:enumeration value="LOGARITHM"/>
                <xsd:enumeration value="EXPLICIT"/>
        </xsd:restriction>
</xsd:simpleType>
<xsd:complexType name="binFunctionType">
        <xsd:annotation>
                <xsd:documentation>
                The MAX and MIN in statistic dataset will be used if they are not provided here
                binTableName is used by EXPLICIT type only
        </xsd:documentation>
        </xsd:annotation>
        <xsd:sequence>
                <xsd:choice>
                        <xsd:element name="binFunctionData" type="segmentationDataType"/>
                        <xsd:element name="binTableName" type="xsd:string"/>
                        <xsd:any minOccurs="0" maxOccurs="unbounded"/>
                </xsd:choice>
        </xsd:sequence>
        <xsd:attribute name="type" type="binType" use="required"/>
</xsd:complexType>
<xsd:complexType name="rectangularWindowType">
        <xsd:sequence>
                <xsd:element name="origin" type="cellCoordinateType"/>
                <xsd:element name="rowHeight" type="xsd:positiveInteger"/>
                <xsd:element name="columnWidth" type="xsd:positiveInteger"/>
                <xsd:any minOccurs="0" maxOccurs="unbounded"/>
        </xsd:sequence>
</xsd:complexType>
<xsd:complexType name="cellCountType">
        <xsd:attribute name="value" type="xsd:double" use="required"/>
        <xsd:attribute name="count" type="xsd:nonNegativeInteger" use="required"/>
        <xsd:anyAttribute/>
</xsd:complexType>
<xsd:complexType name="rasterCountType">
        <xsd:sequence>
                <xsd:element name="cell" type="cellCountType" maxOccurs="unbounded"/>
        </xsd:sequence>
</xsd:complexType>
<xsd:complexType name="histogramType">
        <xsd:sequence>
                <xsd:choice>
                        <xsd:element name="counts" type="rasterCountType"/>
                        <xsd:element name="tableName" type="xsd:string"/>
                </xsd:choice>
        </xsd:sequence>
</xsd:complexType>
<xsd:complexType name="statisticDatasetType">
        <xsd:sequence>
                <xsd:element name="samplingFactor" type="xsd:positiveInteger" default="1"/>
                <xsd:element name="samplingWindow" type="rectangularWindowType" minOccurs="0"/>
                <xsd:element name="MIN" type="xsd:double"/>
                <xsd:element name="MAX" type="xsd:double"/>
                <xsd:element name="MEAN" type="xsd:double"/>
                <xsd:element name="MEDIAN" type="xsd:double"/>
                <xsd:element name="MODEVALUE" type="xsd:double"/>
                <xsd:element name="STD" type="xsd:double"/>
                <xsd:element name="histogram" type="histogramType" minOccurs="0"/>
                <xsd:any minOccurs="0" maxOccurs="unbounded"/>
        </xsd:sequence>
</xsd:complexType>
<xsd:complexType name="cellGrayType">
        <xsd:attribute name="value" type="xsd:double" use="required"/>
        <xsd:attribute name="gray" type="xsd:integer" use="required"/>
        <xsd:anyAttribute/>
</xsd:complexType>
<xsd:complexType name="rasterGrayType">
        <xsd:sequence>
                <xsd:element name="cell" type="cellGrayType" maxOccurs="unbounded"/>
        </xsd:sequence>
</xsd:complexType>
<xsd:complexType name="grayScaleType">
        <xsd:sequence>
                <xsd:choice>
                        <xsd:element name="grays" type="rasterGrayType"/>
```

Oracle No. OID-2003-263-01

ORACLE CONFIDENTIAL

```xml
                            <xsd:element name="tableName" type="xsd:string"/>
                    </xsd:choice>
            </xsd:sequence>
    </xsd:complexType>
    <xsd:complexType name="cellPseudoColorType">
            <xsd:attribute name="value" type="xsd:double" use="required"/>
            <xsd:attribute name="red" type="xsd:integer" use="required"/>
            <xsd:attribute name="green" type="xsd:integer" use="required"/>
            <xsd:attribute name="blue" type="xsd:integer" use="required"/>
            <xsd:attribute name="alpha" type="xsd:double" use="optional"/>
            <xsd:anyAttribute/>
    </xsd:complexType>
    <xsd:complexType name="rasterPseudoColorType">
            <xsd:sequence>
                    <xsd:element name="cell" type="cellPseudoColorType" maxOccurs="unbounded"/>
            </xsd:sequence>
    </xsd:complexType>
    <xsd:complexType name="colorMapType">
            <xsd:sequence>
                    <xsd:choice>
                            <xsd:element name="colors" type="rasterPseudoColorType"/>
                            <xsd:element name="tableName" type="xsd:string"/>
                    </xsd:choice>
            </xsd:sequence>
    </xsd:complexType>
    <xsd:complexType name="layerType">
            <xsd:sequence>
                    <xsd:element name="layerNumber" type="xsd:nonNegativeInteger"/>
                    <xsd:element name="layerDimensionOrdinate" type="xsd:integer"/>
                    <xsd:element name="layerID" type="xsd:string"/>
                    <xsd:element name="description" type="xsd:string" minOccurs="0"
maxOccurs="unbounded"/>
                    <xsd:element name="scalingFunction" type="scalingFunctionType" minOccurs="0"/>
                    <xsd:element name="binFunction" type="binFunctionType" minOccurs="0"/>
                    <xsd:element name="statisticDataset" type="statisticDatasetType" minOccurs="0"/>
                    <xsd:element name="grayScale" type="grayScaleType" minOccurs="0"/>
                    <xsd:element name="colorMap" type="colorMapType" minOccurs="0"/>
                    <xsd:element name="vatTableName" type="xsd:string" minOccurs="0"/>
                    <xsd:any minOccurs="0" maxOccurs="unbounded"/>
            </xsd:sequence>
    </xsd:complexType>
    <xsd:complexType name="layerDescriptionType">
            <xsd:sequence>
                    <xsd:element name="layerDimension" type="cellDimensionType" default="BAND"/>
                    <xsd:element name="objectLayer" type="layerType" minOccurs="0"/>
                    <xsd:element name="subLayer" type="layerType" minOccurs="0" maxOccurs="unbounded"/>
                    <xsd:any minOccurs="0" maxOccurs="unbounded"/>
            </xsd:sequence>
    </xsd:complexType>
    <xsd:annotation>
            <xsd:documentation> =================================================
                    Part 2: Metadata Elements / Content Structure of Oracle GeoRaster Object
                    =================================================
            </xsd:documentation>
    </xsd:annotation>
    <xsd:element name="georasterMetadata">
            <xsd:complexType>
                    <xsd:sequence>
                            <xsd:element name="objectInfo" type="objectDescriptionType"/>
                            <xsd:element name="rasterInfo" type="rasterDescriptionType"/>
                            <xsd:element name="spatialReferenceInfo"
type="rasterSpatialReferenceSystemType" minOccurs="0"/>
                            <xsd:element name="temporalReferenceInfo"
type="rasterTemporalReferenceSystemType" minOccurs="0"/>
                            <xsd:element name="bandReferenceInfo" type="rasterBandReferenceSystemType"
minOccurs="0"/>
                            <xsd:element name="layerInfo" type="layerDescriptionType"
maxOccurs="unbounded"/>
                            <xsd:element name="sourceInfo" type="xsd:string" minOccurs="0"
maxOccurs="unbounded"/>
                            <xsd:any minOccurs="0" maxOccurs="unbounded"/>
                    </xsd:sequence>
            </xsd:complexType>
    </xsd:element>
</xsd:schema>
```

Oracle No. OID-2003-263-01

ORACLE CONFIDENTIAL

Appendix B. List of GeoRaster SQL API and Tools

GeoRaster methods can be grouped into functionally related groups including:

- Database Administration (Create table, Load and Export etc.)
- Data Manipulation (Copy, Modify, Index, Subset, Transform)
- Cell Data and Metadata Update and Query The following list some key methods for each of the above groups.

Database Administration includes functions performed to instantiate the GeoRaster environment in a database. Key methods targeting database administration for GeoRaster include:
- SDO_GEOR.init - Initializes an empty GeoRaster object, which will be registered by GeoRaster in the xxx_SDO_GEOR_SYSDATA views.
- SDO_GEOR.createBlank - Creates a blank GeoRaster object, in which all cells have the same value.
- SDO_GEOR.copy - Makes a copy of an existing GeoRaster object.
- SDO_GEOR.importFrom - Imports an image or gridded raster data in a file or BLOB object into a GeoRaster object stored in the database.
- SDO_GEOR.exportTo - Exports a GeoRaster object or a subset of a GeoRaster object to a file or to a BLOB object.
- SDO_GEOR.validateGeoraster - Validates a GeoRaster object.
- SDO_GEOR.schemaValidate - Validates a GeoRaster object's metadata against the GeoRaster XML schema.

Data manipulation includes steps taken to get GeoRaster data into a different and optimal state in the database depending on application requirements. Some concepts targeting data manipulation for GeoRaster include:

Georeferencing - GeoRaster currently supports six-parameter affine transformation that georeferences two-dimensional raster data. The affine transformation is a special type of the Functional Fitting polynomial model, which is defined in the GeoRaster XML schema. If an affine transformation is provided and is valid in the metadata, the GeoRaster object is considered georeferenced, and the isReferenced value in the SRS metadata will be TRUE; otherwise, it should be FALSE.

Oracle No. OID-2003-263-01

ORACLE CONFIDENTIAL

Pyramiding - Pyramid levels represent reduced or increased resolution of a raster object that require less or more storage space, respectively. GeoRaster can generate and delete pyramids of any GeoRaster objects.

Change Format - - Under the GeoRaster architecture, all raster cell data are stored in the Raster Data Table. How the cell data are physically organized in the Raster Data Table depend on cell depth, blocking sizes and interleaving types. These parameters can be flexibly changed for any existing GeoRaster object. Application developers can use these parameter functions as a tuning device for physically adjusting the GeoRaster object to addresses various application requirements. This eliminates the need for off-line re-adjustment and loading of the original raster data, or readjusting settings of existing application software.

Subseting – Performs either or both of the following operations: (1) spatial crop, cut, clip, or (2) layer or band subset or duplicate.

Scaling – Enlarges or reduces a GeoRaster object while having a choice of resampling methods (nearest neighbor, bilinear interpolation, cubic convolution, average) using four or six neighboring cells.

The following is a list of key methods provided by GeoRaster:

- SDO_GEOR.changeFormat - Changes the storage format of an existing GeoRaster object, inluding changes of blocking, celldepth and/or interleaving.
- SDO_GEOR.changeFormatCopy - Makes a copy of an existing GeoRaster object using a different storage format.
- SDO_GEOR.generateSpatialExtent - Generates a Spatial geometry that contains the spatial extent of the GeoRaster object.
- SDO_GEOR.georeference - Georeferences a GeoRaster object using specified cell-to-model transformation coefficients.
- SDO_GEOR.generatePyramid - Generates pyramid data for a GeoRaster object.
- SDO_GEOR.deletePyramid - Deletes pyramid data for a GeoRaster object.
- SDO_GEOR.subset - Performs either or both of the following operations: (1) spatial crop, cut, or clip, or (2) layer or band subset, or duplicate.

Oracle No. OID-2003-263-01

ORACLE CONFIDENTIAL

- SDO_GEOR.scale - Scales (enlarges or reduces) a GeoRaster object.
- SDO_GEOR.scaleCopy - Scales (enlarges or reduces) a GeoRaster object and put the result into a new object that reflects the scaling.
- SDO_GEOR.mosaic - Mosaics seamless GeoRaster objects into one GeoRaster object.

GeoRaster cell data and metadata update and query are crucial to successful use of GeoRaster in the Oracle 10g environment. Tens of methods are provided for these purposes and some key methods include:

- SDO_GEOR.getID - Returns the user-defined identifier value associated with a GeoRaster object.
- SDO_GEOR.setID - Sets a user-defined identifier to be associated with a GeoRaster object, or deletes the existing value if you specify a null id parameter.
- SDO_GEOR.getVersion - Returns the user-specified version of a GeoRaster object.
- SDO_GEOR.setVersion - Sets the user-specified version of a GeoRaster object.
- SDO_GEOR.getInterleavingType - Returns the interleaving type for a GeoRaster object.
- SDO_GEOR.getSpatialDimNumber - Returns the number of spatial dimensions of a GeoRaster object.
- SDO_GEOR.getSpatialDimSizes - Returns the number of cells in each spatial dimension of a GeoRaster object.
- SDO_GEOR.getTotalLayerNumber - Returns the total number of layers in a GeoRaster object.
- SDO_GEOR.getBlockSize - Returns the number of cells for each dimension in each block of a GeoRaster object in an array showing the number of cells for each row, column, and (if relevant) band.
- SDO_GEOR.isSpatialReferenced - Returns TRUE if the GeoRaster object is spatially referenced, or FALSE if the GeoRaster object is not spatially referenced.
- SDO_GEOR.setSpatialReferenced - Specifies whether or not a GeoRaster object is spatially referenced, or deletes the existing value if you specify a null isReferenced parameter.
- SDO_GEOR.getSRS - Returns information related to the spatial referencing of a GeoRaster object.

Oracle No. OID-2003-263-01

ORACLE CONFIDENTIAL

- SDO_GEOR.setSRS - Sets the spatial reference information of a GeoRaster object, or deletes the existing information if you specify a null srs parameter.
- SDO_GEOR.getModelSRID - Returns the coordinate system (SDO_SRID value) associated with the model (ground) space for a GeoRaster object.
- SDO_GEOR.setModelSRID - Sets the coordinate system (SDO_SRID value) for the model (ground) space for a GeoRaster object, or deletes the existing value if you specify a null srid parameter.
- SDO_GEOR.getBeginDateTime - Returns the beginning date and time for raster data collection in the metadata for a GeoRaster object.
- SDO_GEOR.setBeginDateTime - Sets the beginning date and time for raster data collection in the metadata for a GeoRaster object, or deletes the existing value if you specify a null beginTime parameter.
- SDO_GEOR.hasPseudoColor - Checks if a layer has pseudocolor information (colormap).
- SDO_GEOR.getColorMap - Returns the colormap for pseudocolor display of a layer.
- SDO_GEOR.setColorMap - Sets the colormap for a layer in a GeoRaster object, or deletes the existing value if you specify a null colorMap parameter.
- SDO_GEOR.getVAT - Returns the name of the value attribute table (VAT) associated with a layer.
- SDO_GEOR.setVAT - Sets the name of the value attribute table (VAT) associated with a layer of a GeoRaster object, or deletes the existing value if you specify a null vatName parameter.
- SDO_GEOR.getPyramidMaxLevel - Returns the level number of the top pyramid of a GeoRaster object.
- SDO_GEOR.getModelCoordinate - Returns the coordinates in the model (ground) coordinate system associated with the point at the specified cell (raster) coordinates.
- SDO_GEOR.getCellCoordinate - Returns the coordinates in the cell (raster) coordinate system associated with the point at the specified model (ground) coordinates.
- SDO_GEOR.getCellValue - Returns the value of a single cell located anywhere in the GeoRaster object by specifying its row, column, and band number in its cell coordinate system, or by specifying a point geometry in its model coordinate system and its logical layer number.

Oracle No. OID-2003-263-01

ORACLE CONFIDENTIAL

- SDO_GEOR.changeCellValue - Updates the value of raster data cells in a specified window and specified bands of a GeoRaster object.
- SDO_GEOR.getRasterSubset – A generic query resulting in a single BLOB object containing all cells of a specified pyramid level that are inside or on the boundary of a specified window and containing only the specified layers.
- SDO_GEOR.getRasterData - Creates a single BLOB object that contains all raster data of the input GeoRaster object at the specified pyramid level.

GeoRaster includes several client-side command line tools as well, providing limited support on loading, exporting and viewing GeoRaster objects:

- GeoRaster loader, which loads raster files into the GeoRaster objects
- GeoRaster viewer, which displays GeoRaster objects and metadata in a Java viewer application.
- GeoRaster exporter, which exports GeoRaster objects or subset of them to raster files.

Oracle No. OID-2003-263-01

What is claimed is:

1. In a database management system, a system for handling geographic raster data comprising:
   a first data table including a plurality of GeoRaster objects, each GeoRaster object including a spatial extent geometry and associated metadata, the spatial extent geometry identifying a footprint of a geographic raster data object and associated with at least one block of raster data;
   a second data table including a plurality of raster objects, each raster object associated with one block of raster data of a GeoRaster object and including information indicating a spatial extent of the block of raster data and information relating to the block of raster data;
   a first spatial index built on the first data table based on the spatial extent geometry of each of the plurality of GeoRaster objects, the first spatial index operable to retrieve a GeoRaster object from the first data table based on a relative spatial location of the GeoRaster object;
   a primary key index built on the second data table based on the information relating to the block of raster data, the index operable to retrieve a raster object from the second data table based on the information relating to the block of raster data associated with the retrieved raster object; and
   a viewer operable to display at least a GeoRaster object.

2. The system of claim 1, wherein each GeoRaster object further comprises raster type information indicating a number of spatial dimensions of the GeoRaster object and band or layer information of the GeoRaster object.

3. The system of claim 2, wherein each GeoRaster object further comprises information identifying the second data table for each block of raster data in the GeoRaster object.

4. The system of claim 3, wherein each GeoRaster object further comprises information identifying a raster object in the second data table for each block of raster data in the GeoRaster object.

5. The system of claim 4, wherein each raster object further comprises information matching information identifying a raster object in the second data table in a GeoRaster object.

6. The system of claim 5, wherein each raster object further comprises information indicating a resolution of raster data associated with the raster object.

7. The system of claim 6, wherein each raster object further comprises information identifying a block of raster data associated with the raster object.

8. The system of claim 7, wherein the associated metadata comprises object metadata including object description information and object version information, raster metadata including cell depth information, dimensionality information, blocking information, and interleaving information.

9. The system of claim 8, wherein the associated metadata further comprises spatial reference system information relating to a polynomial transformation for georeferencing.

10. The system of claim 9, wherein the polynomial transformation is an affine transformation.

11. The system of claim 10, wherein the associated metadata further comprises information relating to layers in a GeoRaster object.

12. The system of claim 11, wherein the associated metadata further comprises image/cell attribution information, scaling factor information, color related information, and layer-based attribute information for each layer.

13. The system of claim 12, wherein the first spatial index comprises an R-Tree index.

14. The system of claim 13, wherein the second index comprises a B-Tree index.

15. The system of claim 1, further comprising:
   a second spatial index built on the second data table based on the information indicating a spatial extent of the block of raster data of each of the plurality of raster data objects, the second spatial index operable to retrieve a raster object from the second data table based on a relative spatial location of a block of raster data associated with the retrieved raster object.

16. The system of claim 15, wherein the second spatial index comprises a R-Tree index.

17. The system of claim 15, further comprising a trigger operable to perform an action after a data manipulation language operation affecting a GeoRaster object.

18. The system of claim 17, wherein the data manipulation language operation comprises at least one of inserting a row, updating the GeoRaster object, and deleting a row.

19. The system of claim 15, further comprising a system data table operable to maintain a relationship between the first data table and the second data table.

20. The system of claim 19, further comprising a trigger operable to maintain the system data table and GeoRaster object integrity after a data definition language operation is performed on the first data table.

21. The system of claim 20, wherein the data definition language operation comprises at least one of a drop operation and a truncate operation.

22. In a database management system, a computer-implemented method of workflow for handling geographic raster data comprising the steps of:
   creating, initializing, and validating a first data table including a plurality of GeoRaster objects, each GeoRaster object including a spatial extent geometry and associated metadata, the spatial extent geometry identifying a footprint of a geographic raster data object and associated with at least one block of raster data;
   creating a second data table including a plurality of raster objects, each raster object associated with one block of raster data of a GeoRaster object and including information indicating a spatial extent of the block of raster data and information relating to the block of raster data;
   creating a first spatial index built on the first data table based on the spatial extent geometry of each of the plurality of GeoRaster objects, the first spatial index operable to retrieve a GeoRaster object from the first data table based on a relative spatial location of the GeoRaster object;
   creating a primary key index built on the second data table based on the information relating to the block of raster data, the index operable to retrieve a raster object from the second data table based on the information relating to the block of raster data associated with the retrieved raster object; and
   displaying at least a GeoRaster object.

23. The method of claim 22, wherein each GeoRaster object further comprises raster type information indicating a number of spatial dimensions of the GeoRaster object and band or layer information of the GeoRaster object.

24. The method of claim 23, wherein each GeoRaster object further comprises information identifying the second data table for each block of raster data in the GeoRaster object.

25. The method of claim 24, wherein each GeoRaster object further comprises information identifying a raster object in the second data table for each block of raster data in the GeoRaster object.

26. The method of claim 25, wherein each raster object further comprises information matching information identifying a raster object in the second data table in a GeoRaster object.

27. The method of claim 26, wherein each raster object further comprises information indicating a resolution of raster data associated with the raster object.

28. The method of claim 27, wherein each raster object further comprises information identifying a block of raster data associated with the raster object.

29. The method of claim 28, further comprising the step of:
changing a format of the first data table.

30. The method of claim 28, further comprising the step of:
querying and/or updating metadata associated with a GeoRaster object.

31. The method of claim 28, further comprising the step of:
processing at least some of the plurality of GeoRaster objects.

32. The method of claim 28, further comprising the step of:
exporting at least some of the plurality of GeoRaster objects.

33. The method of claim 28, further comprising the step of:
viewing at least some of the plurality of GeoRaster objects.

34. The method of claim 24, further comprising the step of:
creating a second spatial index built on the second data table based on the information indicating a spatial extent of the block of raster data of each of the plurality of raster data objects, the second spatial index operable to retrieve a raster object from the second data table based on a relative spatial location of a block of raster data associated with the retrieved raster object.

35. The method of claim 34, wherein the second spatial index comprises a R-Tree index.

36. The method of claim 34, further comprising operating a trigger to perform an action after a data manipulation language operation affecting a GeoRaster object.

37. The method of claim 36, wherein the data manipulation language operation comprises at least one of inserting a row, updating the GeoRaster object, and deleting a row.

38. The method of claim 34, further comprising creating a system data table operable to maintain a relationship between the first data table and the second data table.

39. The method of claim 38, further comprising operating a trigger to maintain the system data table and GeoRaster object integrity after a data definition language operation is performed on the first data table.

40. The method of claim 39, wherein the data definition language operation comprises at least one of a drop operation and a truncate operation.

* * * * *